(12) United States Patent
Kawaguchi et al.

(10) Patent No.: US 11,841,318 B2
(45) Date of Patent: Dec. 12, 2023

(54) IDENTIFICATION APPARATUS

(71) Applicant: CANON KABUSHIKI KAISHA, Tokyo (JP)

(72) Inventors: Makoto Kawaguchi, Kanagawa (JP); Yuki Yonetani, Kanagawa (JP); Shigeru Ichihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 17/707,616

(22) Filed: Mar. 29, 2022

(65) Prior Publication Data

US 2022/0317030 A1    Oct. 6, 2022

(30) Foreign Application Priority Data

Mar. 30, 2021  (JP) ................. 2021-058485

(51) Int. Cl.
*G01N 21/31* (2006.01)
*G01J 3/02* (2006.01)
*G01J 3/28* (2006.01)

(52) U.S. Cl.
CPC ......... *G01N 21/314* (2013.01); *G01J 3/0208* (2013.01); *G01J 3/0275* (2013.01); *G01J 3/2823* (2013.01)

(58) Field of Classification Search
CPC ...... G01N 21/314; G01N 21/85; G01N 21/65; G01N 2021/845; G01N 2021/8592; G01J 3/0208; G01J 3/0275; G01J 3/2823; B07C 5/342; B07C 5/366

See application file for complete search history.

(56) References Cited

U.S. PATENT DOCUMENTS

| 2007/0103682 A1* | 5/2007 | Yoo | G01J 3/0218 |
| | | | 356/318 |
| 2014/0029004 A1* | 1/2014 | Bodkin | G01J 3/36 |
| | | | 356/328 |

FOREIGN PATENT DOCUMENTS

| JP | 2008-046132 A | 2/2008 |
| JP | 2013174499 A | 9/2013 |
| JP | 2019105628 A | 6/2019 |

OTHER PUBLICATIONS

JP2019105628A English translation from espacenet.com (Year: 2019).*

* cited by examiner

*Primary Examiner* — Tarifur R Chowdhury
*Assistant Examiner* — Carlos Perez-Guzman
(74) *Attorney, Agent, or Firm* — Canon U.S.A., Inc. I.P. Division

(57) ABSTRACT

Provided is an identification apparatus wherein each spectral light beam corresponding to a predetermined wavenumber shift is projected to the imaging portion) so that a distance between a projection position of the spectral light beam corresponding to the predetermined wavenumber shift on the imaging portion and a changed projection position as a result of the different excitation wavelength is shorter than a distance at the imaging lens between an optical path of the spectral light beam corresponding to the predetermined wavenumber shift and a changed optical path as a result of the different excitation wavelength.

20 Claims, 9 Drawing Sheets

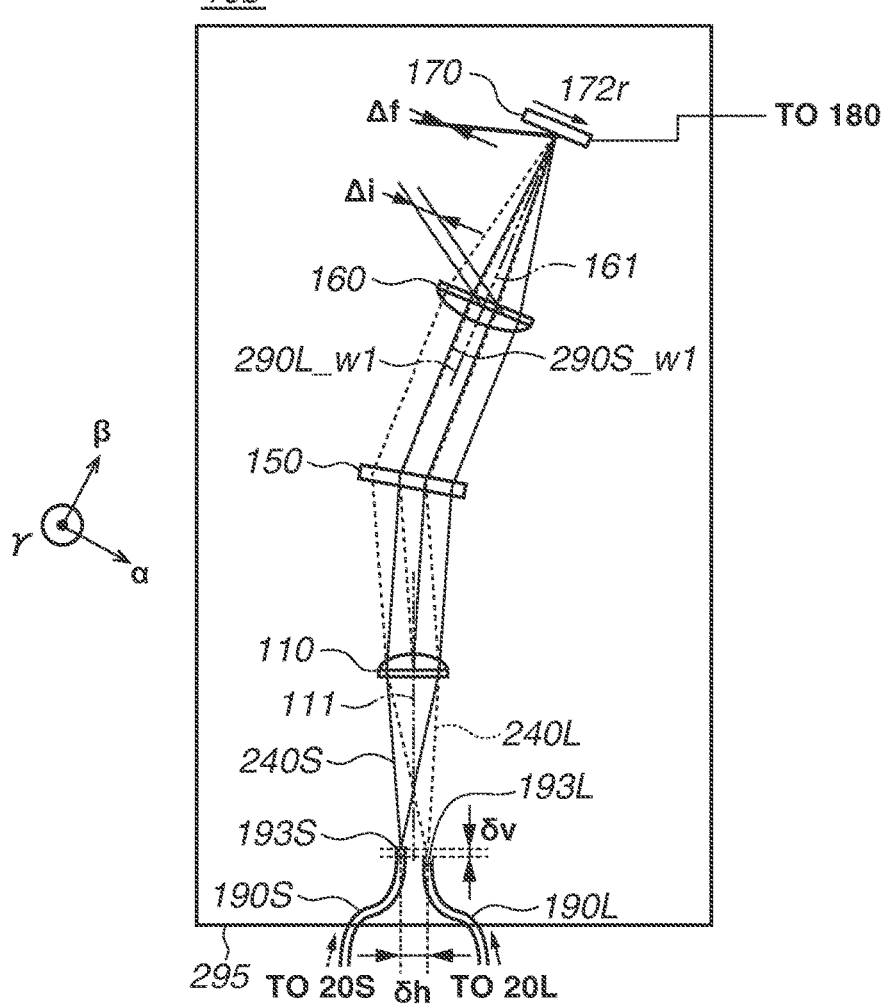
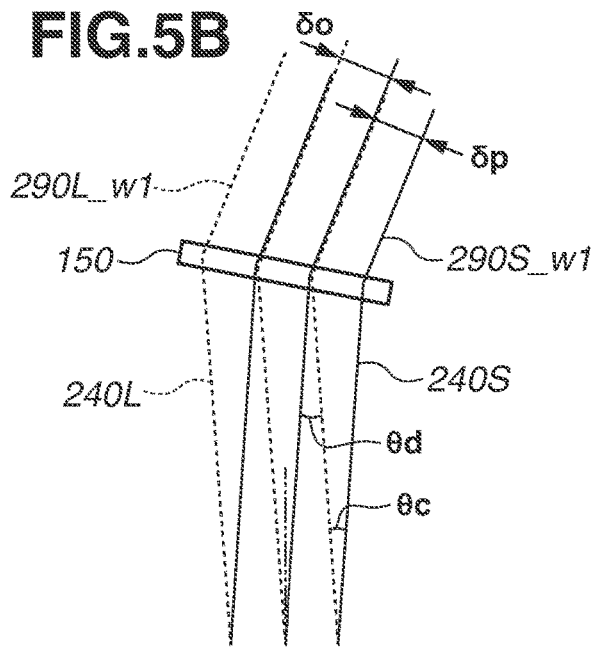
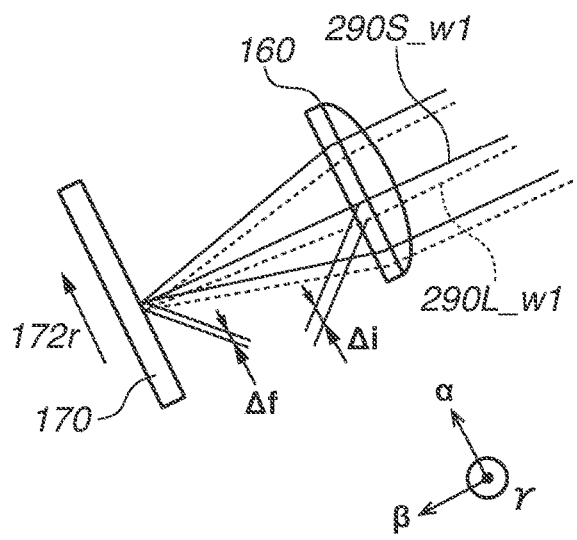

IDENTIFICATION APPARATUS

BACKGROUND OF THE INVENTION

Field of the Invention

The present invention relates to an identification apparatus configured to identify properties of a test sample.

Description of the Related Art

Identification apparatuses that optically identify properties of test samples using spectroscopy analysis are known. The identification apparatuses are disposed in the middle of conveyance portions where the test samples are conveyed, and the identification apparatuses are used in inspecting manufactured articles or separating waste materials. Since the spectroscopy analysis can identify properties of test samples in an atmosphere without vacuum evacuation processing, atmosphere control processing, liquid immersion processing, and drying, which limit the throughput of the analysis, attempts to apply the spectroscopy analysis to the separation of waste resins have been made in recent years.

Absorption spectroscopy and scattering spectroscopy are known spectroscopy analysis methods. Absorption spectroscopy acquires an absorption spectrum of a test sample with respect to irradiation light. Scattering spectroscopy acquires a scattering spectrum of a test sample with respect to irradiation light. Scattering spectroscopy is often used in identifying waste materials with varying object sizes and varying contained materials because this method is less likely to be affected by light attenuation in a thickness direction of a test sample. Raman scattering spectroscopy that disperses Raman scattered light is suitable for use in identifying resins because this method uses Raman spectra exhibiting wavenumber shifts specific to molecular bonds of hydrocarbons.

An identification apparatus that irradiates a test sample with laser light of a predetermined wavelength as excitation light, disperses Raman scattered light from the test sample using a dispersion element, and projects the dispersed light to an image sensor to thereby obtain spectral images in parallel is known. Japanese Patent Application Laid-Open No. 2019-105628 discusses an identification apparatus that uses a semiconductor laser as a light source and acquires a Raman spectral image of a resin using the excitation light of a predetermined wavelength and an image sensor such as a complementary metal oxide semiconductor (CMOS) image sensor or a charge-coupled device (CCD) image sensor.

Meanwhile, in use cases of screening or recycling of waste materials, since a test sample is obtained from markets, colors of scattering, absorption, and reflection vary. Thus, with a single-color excitation light beam, an optical spectrum effective for identification may not be obtained with sufficient sensitivity. A technique for increasing the identification accuracy of an identification apparatus for a test sample containing a mixture of white and black resins by switching an excitation light beam between excitation light beams of different wavelengths and emitting the switched excitation light beam is known. Japanese Patent Application Laid-Open No. 2013-174499 discusses two forms of a Raman spectrum identification apparatus. A single optical system form shares a dispersion optical system including an irradiation portion, a light collecting portion, a dispersing device, and an image sensor other than two excitation light sources. A two optical system form includes two excitation light sources, two irradiation portions, two light collecting portions, two dispersing devices, and two image sensors. The identification apparatuses according to the two embodiments discussed in Japanese Patent Application Laid-Open No. 2013-174499 determine whether to perform identification processing using one of excitation light beams of two different wavelengths based on intensity information about a Raman spectrum acquired using the other one of the excitation light beams.

The identification apparatus of the single optical system form discussed in Japanese Patent Application Laid-Open No. 2013-174499 is advantageous in that the robustness against a population of test samples in identifying test samples exhibiting different colors is high. Furthermore, the efficiency of use of the components of the identification apparatus is higher than the identification apparatus of the two optical system form. This is desirable for reducing the size of the identification apparatus. However, since one dispersing device is used for two excitation wavelengths $\lambda S$ and $\lambda L$, projection positions of spectral light beams corresponding to the same Raman shift (wavenumber shift) and projected to an imaging portion are displaced correspondingly to the two excitation wavelengths $\lambda S$ and $\lambda L$ on a diffraction plane. The diffraction plane corresponds to a plane where a diffraction angle of a grating or a diffraction mirror of a dispersing element expands.

Thus, the identification apparatus of the single optical system form discussed in Japanese Patent Application Laid-Open No. 2013-174499 images, for each of the two excitation wavelengths $\lambda S$ and $\lambda L$, the same wavenumber shift band corresponding to a dispersion target band as an identification target and acquires a spectral image. At this time, the identification apparatus of the single optical system form discussed in Japanese Patent Application Laid-Open No. 2013-174499 has an optical spectrum projection form without a shared photo detection element to receive the spectral images corresponding to the two excitation wavelengths $\lambda S$ and $\lambda L$, and this gives rise to a concern that the efficiency of use of the imaging portion is insufficient. Specifically, there arises a concern about a decrease of the efficiency of use of the imaging portion due to an increased percentage of the number of photo detection elements that are used for irradiation light beams of one of the excitation wavelengths but are not used for irradiation light beams of another in an effective imaging region on the image sensor.

For example, in a case where a target identification band of irradiation light beams of excitation wavelengths of 514 nm and 633 nm is set to 500 $cm^{-1}$ to 2500 $cm^{-1}$, a necessary wavelength band is 528 nm to 752 nm including 528 nm to 590 nm and 654 nm to 752 nm. Thus, even in a case where the image sensor and the dispersing element are shared and a projection spectrum is projected to a shared line by switching each excitation wavelength, a sufficient number of elements for receiving a band that is 3.6 times an initial target identification band and a band that is 2.3 times the initial target identification band are still necessary. In other words, the efficiency of use of the image sensor decreases.

Decreasing the percentage of the number of photo detection elements that are not used and generated correspondingly to the excitation wavelength in the effective imaging region of the imaging portion can increase the number of channels of spectral images to be projected to the effective imaging region, so that the throughput of the identification processing increases. Similarly, decreasing the percentage of the number of photo detection elements that are not used and generated correspondingly to the excitation wavelength in the effective imaging region can shorten the wavenumber band that the photo detection elements in the effective imaging region convert, whereby the energy resolution in the wavenumber direction increases.

Specifically, although the efficiency of use of the components by the identification apparatus of the single optical system form discussed in Japanese Patent Application Laid-Open No. 2013-174499 is better than the identification apparatus of the two optical system form, there has been a demand for improvement in arrangement of the dispersion optical system that affects the efficiency of use of the imaging portion. In other words, the efficiency of use of the imaging portion by the identification apparatus of the single optical system form discussed in Japanese Patent Application Laid-Open No. 2013-174499 has been insufficient, and further improvement has been demanded.

SUMMARY OF THE INVENTION

The present invention is directed to an identification apparatus configured so that projection positions of optical spectra corresponding to irradiation light beams of different excitation wavelengths become closer to each other and the efficiency of use of components including an imaging portion is increased.

According to an aspect of the present invention, an identification apparatus includes an irradiation portion optically connected to a light source configured to generate light beams of different excitation wavelengths, the irradiation portion configured to irradiate a test sample with the light beams, a light collecting portion configured to collect a scattered light beam from the test sample irradiated with each light beam, a dispersing portion configured to disperse each light beam from the light collecting portion, an imaging lens through which each spectral light beam dispersed by the dispersing portion travels, and an imaging portion configured to image each spectral light beam projected through the imaging lens and acquire a spectral image, wherein each spectral light beam corresponding to a predetermined wavenumber shift is projected to the imaging portion so that a distance between a projection position of the spectral light beam corresponding to the predetermined wavenumber shift on the imaging portion and a changed projection position as a result of the different excitation wavelength is shorter than a distance at the imaging lens between an optical path of the spectral light beam corresponding to the predetermined wavenumber shift and a changed optical path as a result of the different excitation wavelength.

Further features of the present invention will become apparent from the following description of exemplary embodiments with reference to the attached drawings.

BRIEF DESCRIPTION OF THE DRAWINGS

FIG. 5A is a detailed view illustrating a schematic configuration of a spectral image acquisition portion 10b according to a third embodiment. FIGS. 5B and 5C are views illustrating an effect of a plurality of emission portions.

DESCRIPTION OF THE EMBODIMENTS

Various embodiments of the present invention will be described below with reference to the drawings.

Figure 1:
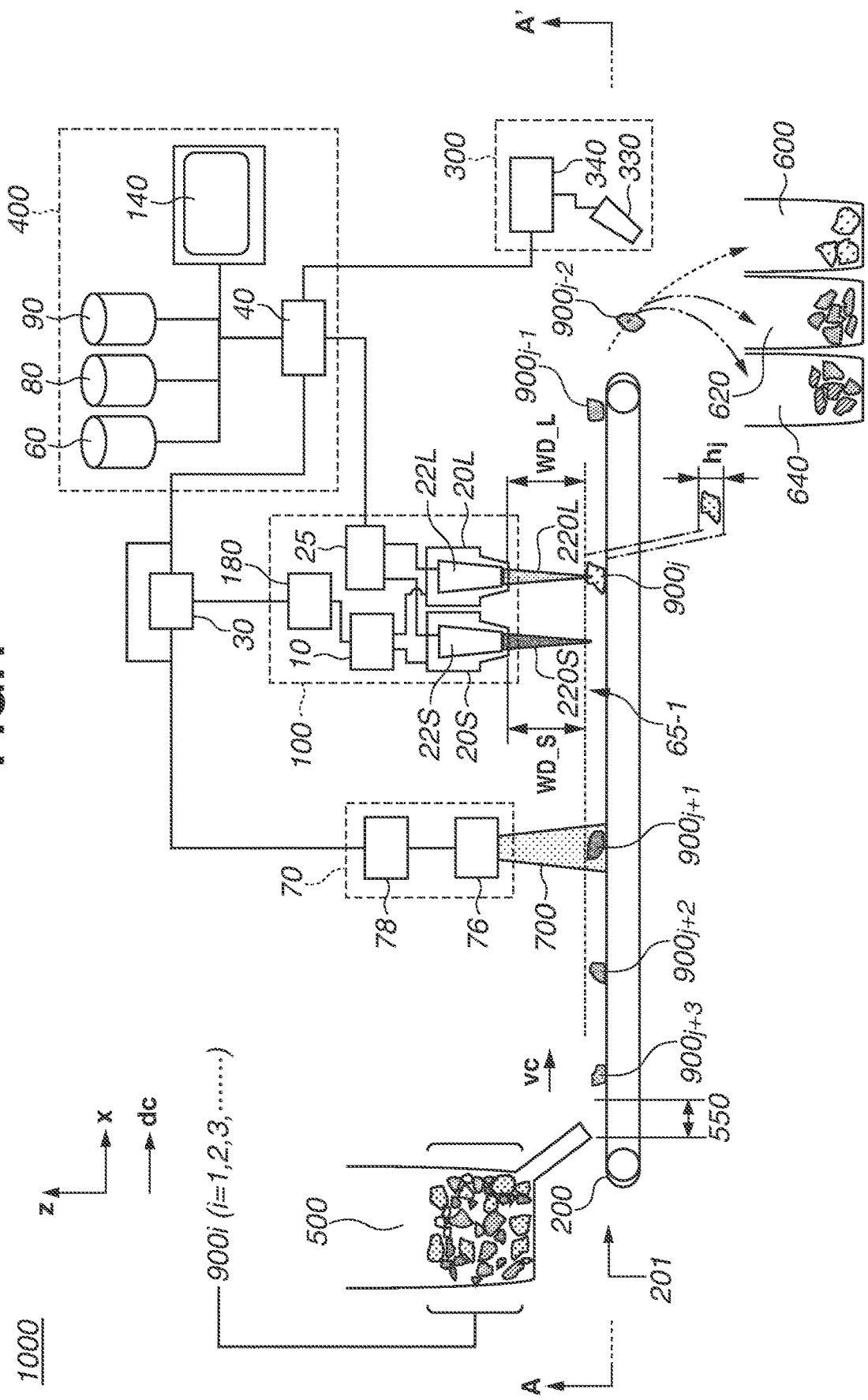
FIG. 1 is a diagram illustrating a schematic configuration of an identification apparatus according to a first embodiment.
Figure 2A:
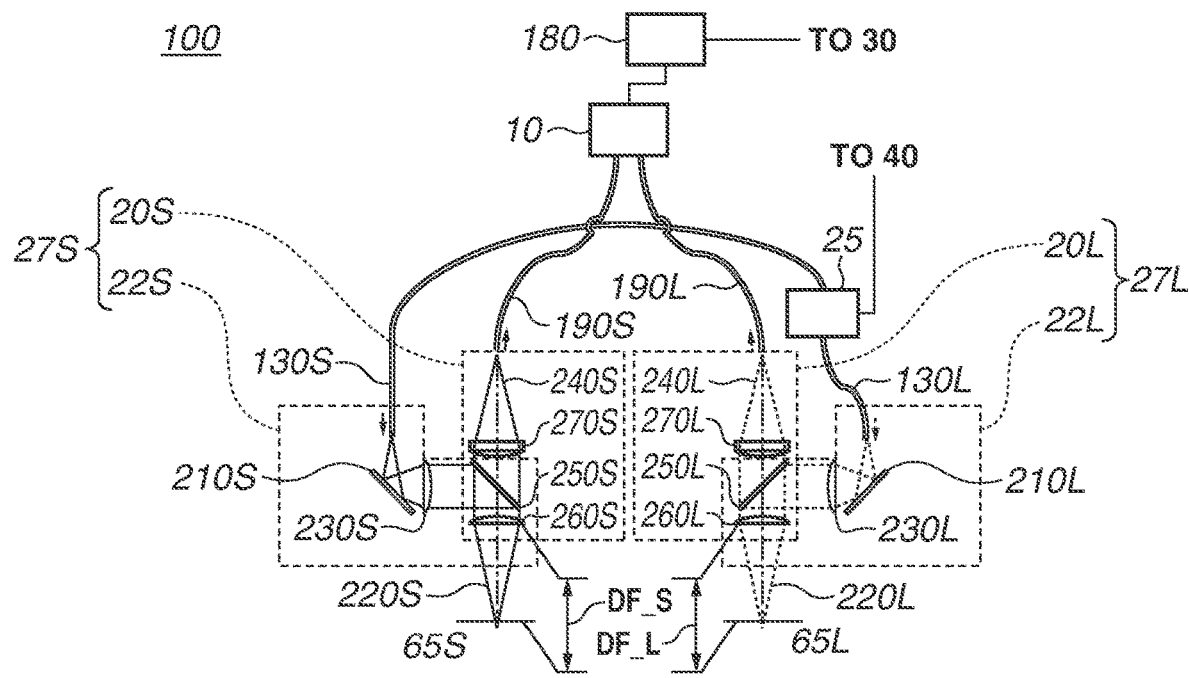
FIG. 2A is a diagram illustrating a schematic configuration of a spectral information acquisition portion according to the first embodiment.
Figure 2B:
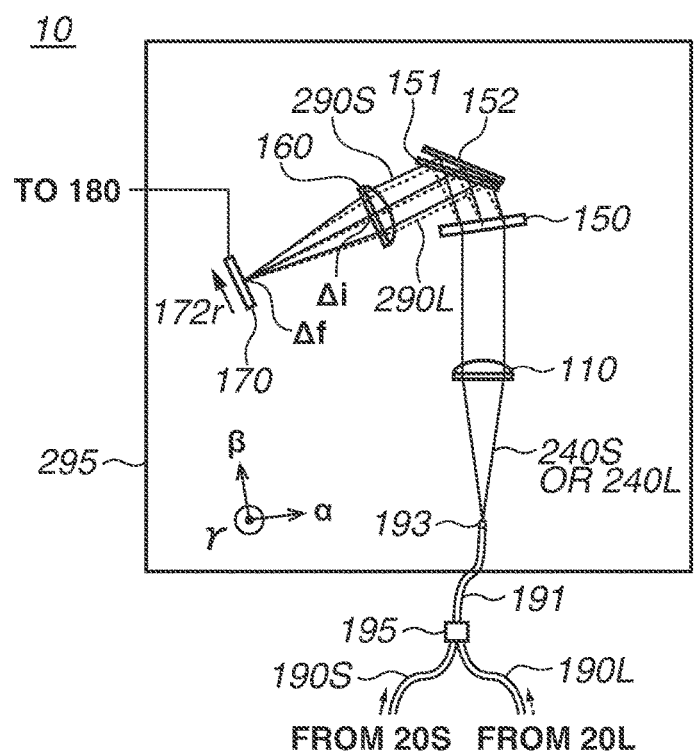
FIG. 2B is a diagram illustrating a schematic configuration of an image information acquisition portion.
Figure 2C:
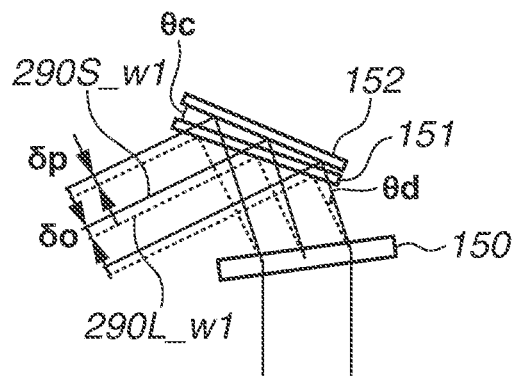
FIGS. 2C and 2E are partially enlarged views illustrating a configuration with a dichroic mirror according to the first embodiment and a configuration without a dichroic mirror according to a reference embodiment.
Figure 2E:
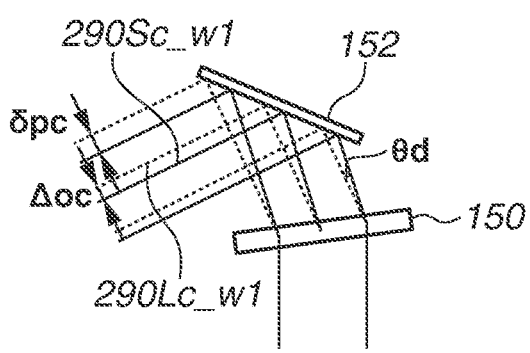
Figure 2D:
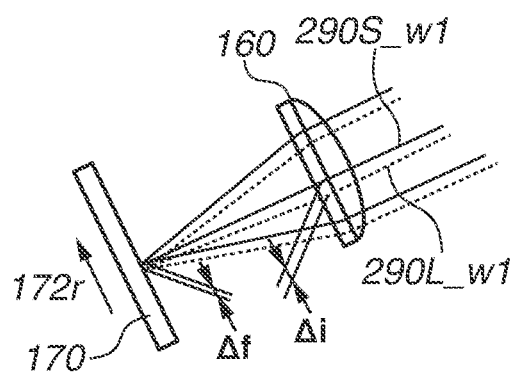
FIGS. 2D and 2F are views illustrating differences Δf and Δfc of imaging positions with respect to a wavenumber shift.
Figure 2F:
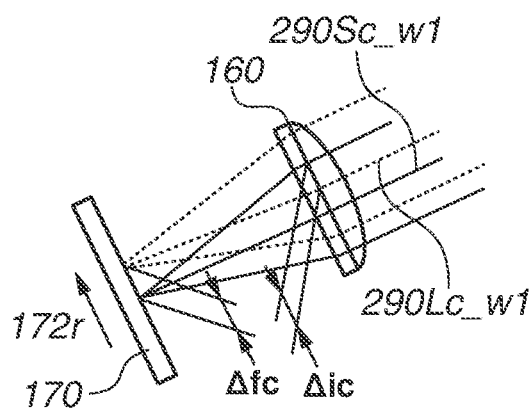

An identification apparatus according to a first embodiment will be described below with reference to FIGS. 1 and 2A to 2F. FIG. 1 is a view schematically illustrating a configuration of an identification apparatus 1000 according to the present embodiment. FIG. 2A is a detailed partial view illustrating a spectral information acquisition portion 100 of the identification apparatus 1000 illustrated in FIG. 1. FIG. 2B is a detailed view illustrating a spectral image acquisition portion 10 of the spectral information acquisition portion 100 illustrated in FIG. 2A. FIG. 2C is an enlarged view illustrating a neighborhood of a mirror 152 to illustrate an effect of a dichroic mirror 151 according to the present embodiment. FIG. 2D is an enlarged view illustrating a neighborhood of an imaging lens 160 and an imaging portion 170 to illustrate an effect of a dichroic mirror 151 according to the present embodiment. FIGS. 2E and 2F are enlarged views illustrating light beams in a reference case where the dichroic mirror 151 is absent. FIGS. 2E and 2F respectively correspond to FIGS. 2C and 2D.

In FIG. 1, a −z direction corresponds to a vertical direction and a gravity direction, an x direction corresponds to a conveyance direction dc, a y direction corresponds to a conveyance width direction dw, and an xy plane corresponds to a horizontal plane. The conveyance width direction dw corresponds to a direction that is parallel to a conveyance surface 201 and is perpendicular to the conveyance direction dc.

(Identification Apparatus)

The identification apparatus 1000 includes irradiation portions 22S and 22L. The irradiation portions 22S and 22L emit irradiation light beams 220S and 220L of different wavelengths at different time points toward a test sample 900i conveyed in the conveyance direction dc to focus the irradiation light beams 220S and 220L on the test sample 900i as illustrated in FIG. 1. In other words, an irradiation portion 22 includes the irradiation portions 22S and 22L to emit the irradiation light beams 220S and 220L corresponding to at least excitation light beams of different wavelengths at different timings. The attached letters S and L indicate that the corresponding irradiation light beams have different wavelengths from each other. The attached letter S indicates that the corresponding irradiation light beam has a shorter wavelength than that of the irradiation light beam corresponding to the attached letter L.

Arrangements configured to emit the irradiation light beams 220S and 220L corresponding to at least excitation light beams of different wavelengths at different timings include an arrangement in which the irradiation light beams 220S and 220L are switched at time points ti_S and ti_L. Specifically, the arrangements configured to emit the irradiation light beams 220S and 220L at different timings include an arrangement in which the wavelengths are alternately switched sequentially at the time points ti_S, ti_L, ti+1_S, ti+1_L, ti+2_S, ti+2_L . . . .

Further, the arrangements configured to emit the irradiation light beams 220S and 220L at different timings include an arrangement that includes both a period during which the irradiation light beams 220S and 220L having a different wavelength from each other are simultaneously emitted and a period during which neither of the irradiation light beams 220S and 220L having a different wavelength from each other is emitted.

The test sample 900i is fed to a conveyance portion 200 by a feeder 500 and conveyed along the conveyance direction dc by the conveyance portion 200. The irradiation light beams 220S and 220L are also referred to as "primary light beams 220S and 220L" or "convergent light beams 220S and 220L".

Further, the identification apparatus 1000 includes light collecting portions 20S and 20L corresponding to the irradiation portions 22S and 22L as illustrated in FIG. 1. The light collecting portions 20S and 20L collect scattered light (secondary light beams) from the test sample 900i. Further, the identification apparatus 1000 includes an acquisition portion 30 as illustrated in FIG. 1. The acquisition portion 30 acquires identification information for identifying properties of the test sample 900i based on at least one of secondary light beams 240S and 240L collected respectively by the light collecting portions 20S and 20L.

Further, the identification apparatus 1000 includes the conveyance portion 200 and a discrimination device 300 situated downstream of the conveyance portion 200 in the conveyance direction dc as illustrated in FIG. 1. The conveyance portion 200 includes a conveyor belt that conveys the test sample 900i in the x direction at a conveyance velocity vc.

Next, a spectral information acquisition portion of the identification apparatus 1000 that relates to a feature of the present invention will be described below with reference to FIG. 2A.

(Spectral Information Acquisition Unit)

The identification apparatus 1000 includes the spectral information acquisition portion 100 configured to acquire spectral information about the secondary light beams 240S and 240L collected from the test sample 900i. The spectral information acquisition portion 100 is a unit that acquires a Raman spectrum from a wavenumber difference (wavenumber shift against excitation light) between Raman scattered light included in the secondary light beams 240S and 240L from the test sample 900i and excitation light included in the primary light beams 220S and 220L.

The spectral information acquisition portion 100 includes the irradiation portions 22S and 22L as illustrated in FIGS. 1 and 2A. The irradiation portions 22S and 22L respectively irradiate the test sample 900i with the irradiation light beams (primary light beams) 220S and 220L having a different wavelength from each other at different time points. The spectral information acquisition portion 100 also includes the light collecting portions 20S and 20L that respectively collect the corresponding secondary light beams 240S and 240L from the test sample 900i. Excitation light irradiation timings are controlled so that only one of the irradiation light beams 220S and 220L is emitted toward the test sample 900i at each time point. An arrangement in which the irradiation light beams 220S and 220L corresponding to two excitation wavelengths λS and λL are not simultaneously emitted is included. According to the present embodiment, the irradiation portions 22S and 22L and the light collecting portions 20S and 20L are concentrically situated, respectively, on opposite sides of a central axis, and the irradiation portions 22S and 22L are optically connected to a light source 25 via optical fibers 130S and 130L. The light source 25 includes one or more laser light sources. The light collecting portions 20S and 20L are optically connected to the spectral image acquisition portion 10 via optical fibers 190S and 190L so that the spectral information acquisition portion 100 can acquire optical information reflecting materials contained in the test sample 900i.

(Light Collecting Unit)

FIG. 2A is a view schematically illustrating an example of a configuration of the spectral information acquisition portion 100. The spectral information acquisition portion 100 includes light collecting units 27S and 27L respectively including the irradiation portions 22S and 22L and the light collecting portions 20S and 20L. The irradiation portions 22S and 22L irradiate the test sample 900i with the irradiation light beams 220S and 220L, and the light collecting portions 20S and 20L collect the secondary light beams 240S and 240L from the test sample 900i. The irradiation portions 22S and 22L and the light collecting portions 20S and 20L are concentrically situated, respectively, on opposite sides of a central axis parallel to the irradiation light beams 220S and 220L. Thus, even in a case where an irradiated surface of the test sample 900i has a height difference or is tilted, positional shifts are less likely to occur between a center of a spot of condensed irradiation light and a center of a flux of scattered light (secondary light beams) to be collected. In the example illustrated in FIG. 2A, light exit ends of the optical fibers 130S and 130L, spots of the condensed irradiation light beams 220S and 220L, and light collection ends 192S and 192L of the optical fibers 190S and 190L have a conjugate relationship. Specifically, the light collecting units 27S and 27L have a configuration of a confocal optical system.

(Irradiation Portion)

The irradiation portions 22S and 22L are situated above the conveyance portion 200 at predetermined distances WD_S and WD_L from the conveyance surface 201 of the conveyor belt as illustrated in FIG. 1.

The irradiation portions 22S and 22L are situated to condense the irradiation light beams 220S and 220L toward an upper surface of the test sample 900i so that the scattering intensity of Raman scattered light, which is weaker than Rayleigh scattered light by several orders of magnitude, is increased. A unit including the irradiation portions 22S and 22L and the light source 25 is sometimes referred to as "irradiation optical system".

The irradiation portions 22S and 22L include objective lenses 260S and 260L, the dichroic mirrors 250S and 250L, collimating lenses 230S and 230L, and reflecting mirrors 210S and 210L as illustrated in FIG. 2. The objective lenses 260S and 260L use a convex lens, a collimating lens, a concave lens, or a zoom lens.

The collimating lenses 230S and 230L and the objective lenses 260S and 260L can use synthetic quartz as a glass material. While the collimating lenses 230S and 230L and the objective lenses 260S and 260L are irradiated with high-output light from the light source 25, use of synthetic quartz as a glass material reduces background components such as fluorescent light and Raman scattered light that are unnecessary in spectroscopic measurement of the test sample 900$i$.

The objective lenses 260S and 260L act as condensing lenses to condense light from the light source 25 onto the test sample 900$i$ in the irradiation portions 22S and 22L. The objective lenses 260S and 260L form focal planes 65S and 65L at positions separated by focal lengths DF_S and DF_L from the objective lenses 260S and 260L, focal points (also referred to as "focal spot" or "condensing spot") of a focal diameter $\varphi$ (not illustrated), and focal depths $\Delta$DF_S and $\Delta$DF_L correspondingly to a numerical aperture NA. The heights of the focal planes 65S and 65L from the conveyance surface 201 are set considering a distribution of heights hj (refer to FIG. 1) of the test samples 900$i$ (i=1, 2, 3, . . . ).

The collimating lenses 230S and 230L reduce the diffusion of light beams (excitation light) from the light source 25 that are emitted from the optical fibers 130S and 130L and shape the light into parallel light. In place of the optical fibers 130S and 130L and the collimating lens 230S, a single cylindrical lens or a plurality of cylindrical lenses can be used. Alternatively, another collimating optical element such as an anamorphic prism pair can be used. Further, the irradiation portions 22S and 22L can include a wavelength filter such as a laser line filter between the collimating lenses 230S and 230L and the dichroic mirrors 250S and 250L. This improves wavelength characteristics of the irradiation light beams 220S and 220L. While the collimating lenses 230S and 230L shape light into parallel light according to the present embodiment, another lens that has positive power and reduces diffusion but does not necessarily shape the light into parallel light can replace the collimating lenses 230S and 230L.

At least part of the irradiation portions 22S and 22L can be shared with the light collecting portions 20S and 20L as illustrated in FIG. 2A. The light collecting portions 20S and 20L and the irradiation portions 22S and 22L according to the present embodiment are concentrically situated, and the objective lenses 260S and 260L and the dichroic mirrors 250S and 250L are shared by the light collecting portions 20S and 20L and the irradiation portions 22S and 22L.

The irradiation portions 22S and 22L irradiate a placement portion 200 where the test sample 900$i$ is placed with light from the light source 25 through different optical paths 220S and 220L at different time points correspondingly to different excitation wavelengths S as illustrated in FIG. 2A. The irradiation portions 22S and 22L include a plurality of irradiation ends 260S and 260L corresponding to the different excitation wavelengths S.

(Light Source)

The light source 25 generates light beams (excitation light) of different wavelengths in the irradiation portions 22S and 22L via the optical fibers 130S and 130L. The light source 25 selects an excitation wavelength from different excitation wavelengths $\lambda$S and $\lambda$L and generates a light beam of the selected excitation wavelength. The light source 25 can employ a light source selection arrangement in which a light source exclusively selected from a plurality of semiconductor lasers having a different central emission wavelength from each other is driven and generates a light beam at a predetermined time point. The light source 25 can employ a wavelength variable laser arrangement in which two different emission wavelengths are successively switched using a single wavelength variable laser capable of sweeping a wavelength in a predetermined wavelength range. Hereinafter, a light beam of a shorter wavelength will be sometimes referred to as "excitation light beam S" and a light beam of a longer wavelength as "excitation light beam L". The irradiation portions 22S and 22L optically connected to the light source configured to generate a light beam switched between light beams of different excitation wavelengths $\lambda$S and $\lambda$L are also referred to as light exit ends 22S and 22L configured to emit a light beam switched between light beams of different wavelengths.

The light source 25 applied to an irradiation optical system configured to disperse Raman scattered light uses a laser light source that emits a light beam of at least a wavelength in a wavelength range from 400 nm to 1100 nm. In principle, the scattering efficiency of Raman scattered light from the test sample 900$i$ increases at shorter excitation wavelengths whereas fluorescent components to be background components decrease at longer excitation wavelengths. For example, the intensity of Raman scattered light having an excitation wavelength of 473 nm can be three times or more than three times higher than the intensity of Raman scattered light having an excitation wavelength of 638 nm.

An excitation wavelength of a laser light source applied to the light source 25 is selected so that a difference between Raman spectra of target and non-target materials contained in a test sample of interest is clearly obtained. Furthermore, in general, an excitation wavelength of an ultraviolet to blue region is desirably selected in order to increase the identification accuracy of black resins with low Raman scattering efficiency, whereas an excitation wavelength of a red to near-infrared region is desirably selected in order to increase the identification accuracy of white resins and fluorescent resins where fluorescent components are often generated. Semiconductor lasers are selected from semiconductor lasers that emit excitation light beams S with central wavelengths of 457 nm, 473 nm, 488 nm, 515 nm, 532 nm, 633 nm, 638 nm, 660 nm, 685 nm, and 785 nm as desired, and the light source 25 configured to switch an excitation wavelength uses the selected semiconductor lasers in combination.

The light source 25 is not limited to semiconductor lasers and can use another laser light source such as a semiconductor-pumped solid-state laser or a gas laser.

(Light Collecting Portion)

The light collecting portions 20S and 20L are situated above the conveyance surface 201 to collect the secondary light beams 240S and 240L from an upper surface of the test sample 900$i$ conveyed by the conveyance portion 200. In other words, the light collecting portions 20S and 20L situated above the conveyance portion 200 correspondingly to irradiation regions of the irradiation light beams 220S and 220L from the irradiation portions 22S and 22L to collect the secondary light beams 240S and 240L from an upper surface of the test sample 900$i$ conveyed through the irradiation regions.

The light collecting portions 20S and 20L include the objective lenses 260S and 260L, the dichroic mirrors 250S and 250L, imaging lenses 270S and 270L, and the optical fibers 190S and 190L. Like the irradiation portions 22S and 22L, the objective lenses 260S and 260L of the light collecting portions 20S and 20L include a convex lens, a collimating lens, a concave lens, and a zoom lens. The light collecting portions 20S and 20L may include a wavelength filter to reduce light mixed in the secondary light beams 240S and 240L and unnecessary for spectroscopic measurement. Examples are a notch filter that reduces excitation light components contained in primary light beams and a band-pass filter or a long-pass filter that further reduces anti-Stokes light contained in secondary light beams. The secondary light beams 240S and 240L before being dispersed by a dispersing portion 150 are sometimes referred to as "collected scattered light beams 240S and 240L", "guided scattered light beams 240S and 240L", "collected secondary light beams 240S and 240L", or "guided secondary light beams 240S and 240L".

The light collecting portions 20S and 20L include an objective lens having a large numerical aperture to ensure light collection efficiency. The light collecting portions 20S and 20L use the objective lenses 260S and 260L having a numerical aperture of 0.25 or larger and 0.5 or smaller. More specifically, a SCHOTT B-270 lens having an effective lens diameter of 25 mm, a focal length of 20 mm, and a numerical aperture of 0.5 can be used.

Figure 3A:
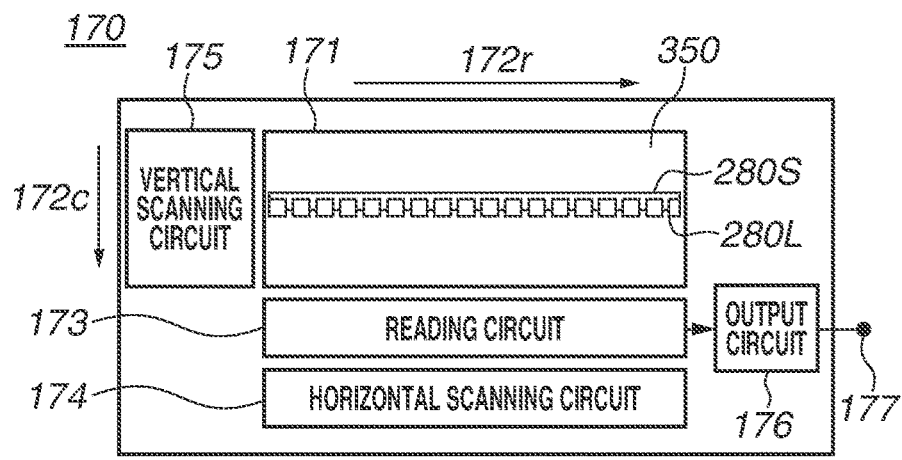
FIG. 3A is a view illustrating a schematic configuration illustrating a relationship between an imaging portion and spectral images according to the first embodiment.
Figure 3B:
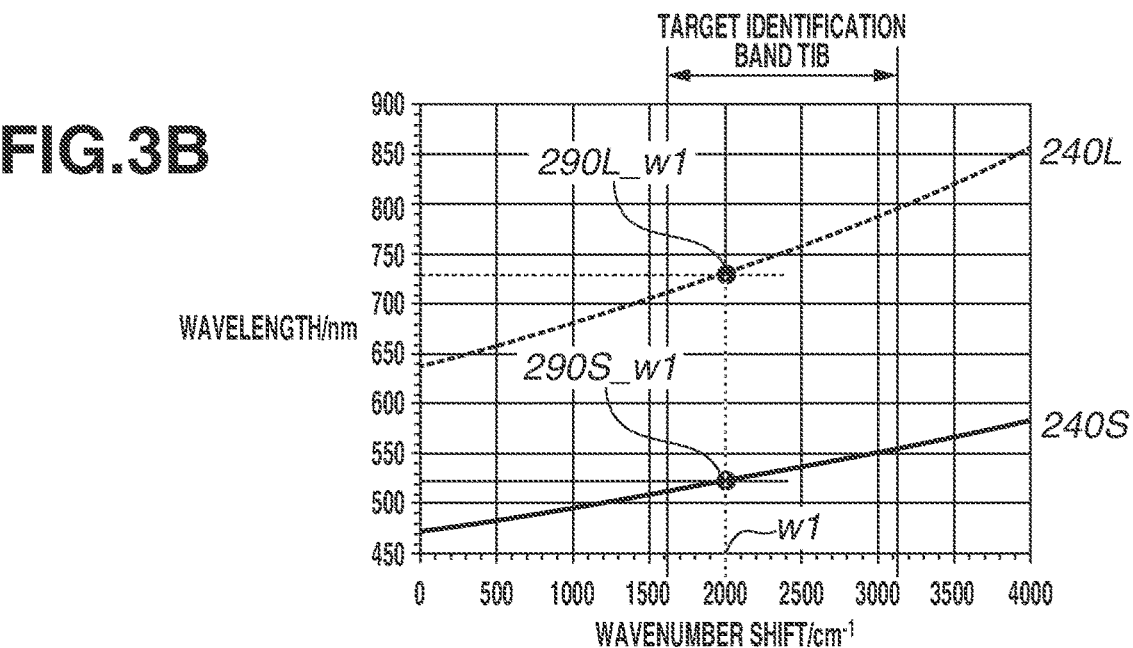
FIG. 3B is a view illustrating the excitation wavelength dependence of optical spectrum wavelengths corresponding to a wavenumber shift.
Figure 3C:
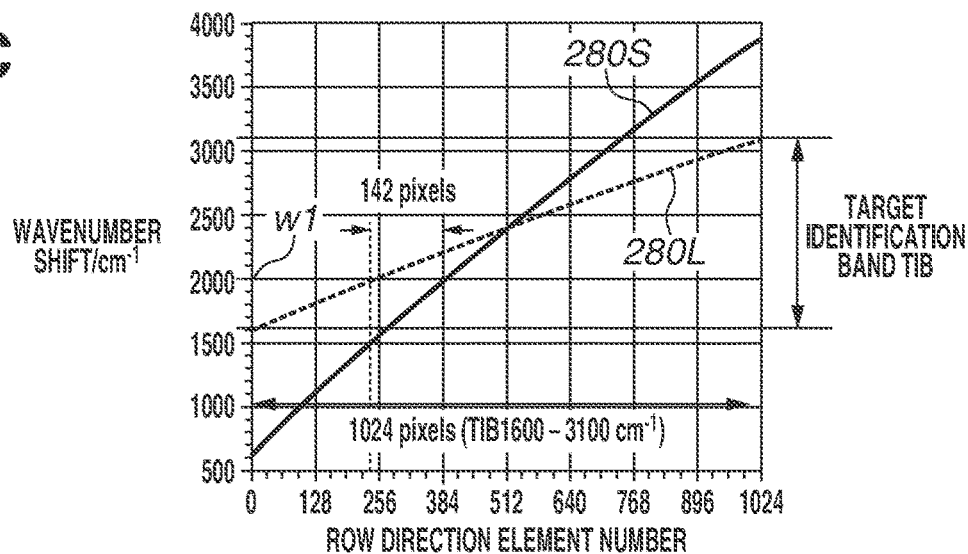
FIGS. 3C and 3D are views illustrating projection positions of spectral images according to the first embodiment with a dichroic mirror and the reference embodiment without a dichroic mirror.
Figure 3D:
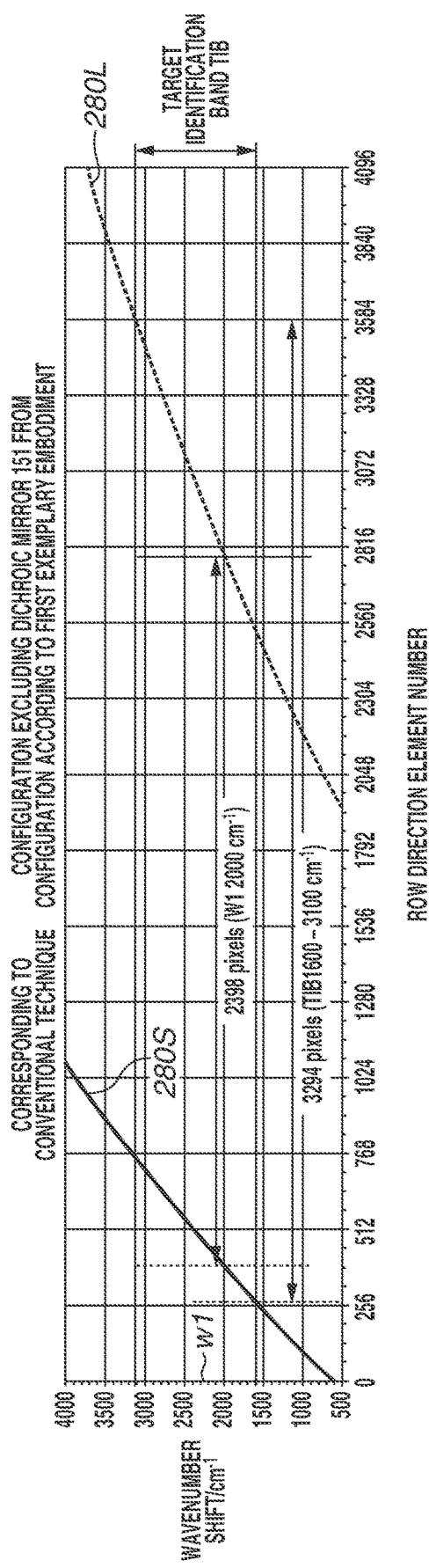

The secondary light beams 240S and 240L collected by the light collecting portions 20S and 20L exhibit different wavelengths correspondingly to a difference in excitation wavelength S as illustrated in FIG. 3D even in a case where the scattered light beams have the same relationship of wavenumber shifts with respect to the excitation light. FIG. 3D illustrates an example where the excitation wavelength corresponding to the secondary light beam 240S is 473 nm and the excitation wavelength corresponding to the secondary light beam 240L is 638 nm.

The light collecting portions 20S and 20L include a plurality of light collection ends 260S and 260L configured to collect light beams collected correspondingly to different optical paths from the irradiation portions 22S and 22L.

(Spectral Image Acquisition Portion)

Next, a dispersing portion, an imaging lens, and the spectral image acquisition portion 10 including an imaging portion that relate to a feature of the present invention will be described in detail below with reference to FIGS. 2B, 2C, 2D, 2E, 3A, 3B, 3C, and 3D.

The spectral image acquisition portion 10 includes a coupler 195, a light guiding portion 191, a test sample 193, a collimating lens 110, and the dispersing portion 150 arranged in this order from the light collecting portions 20S and 20L side as illustrated in FIG. 2B. The spectral image acquisition portion 10 further includes the dichroic mirror 151, the mirror 152, the imaging lens 160, and the imaging portion 170, following the dispersing portion 150. The dichroic mirror 151 and the mirror 152 are situated to have a predetermined angle difference θc between the dichroic mirror 151 and the mirror 152. In other words, the light guiding portion 191 includes the light exit end 193 configured to emit a collected secondary light beam toward the collimating lens 110.

The spectral image acquisition portion 10 includes the light guiding portion 191 and the dichroic mirror 151 situated between the light exit end 193 and the imaging portion 170 as illustrated in FIG. 2B. The light guiding portion 191 includes the light exit end 193 configured to emit a secondary light beam guided from the light collecting portions 20S and 20L toward the dispersing portion 150. Further, the dichroic mirror 151 according to the present embodiment is situated between the dispersing portion 150 and the imaging lens 160 so that optical paths of different spectral light beams 290S and 290L corresponding to different excitation wavelengths S become closer to each other. The spectral light beam 290L is one of the spectral light beams 290S and 290L.

The dispersing portion 150 disperses the secondary light beams 240S and 240L collected by the light collecting portions 20S and 20L, and the spectral light beams 290S and 290L are each projected to the imaging portion 170 via the dichroic mirror 151, the mirror 152, and the imaging lens 160.

The spectral light beams 290S and 290L are projected to photo detection elements that are included in an effective imaging region of the imaging portion 170 and arranged along a row direction 172r. The imaging portion 170 receives the projected spectral light beams 290S and 290L by the photo detection element array of the imaging portion 170, which is arranged along the row direction 172r, and acquires spectral images 280S and 280L. Specifically, the spectral image acquisition portion 10 of the identification apparatus 1000 according to the present embodiment use the components of the optical system other than the mirror 152 and the dichroic mirror 151 for both the irradiation light beams 220S and 220L and the secondary light beams 240S and 240L corresponding to the different excitation wavelengths λS and λL.

According to the present embodiment, the dichroic mirror 151 and the mirror 152 are situated on the optical paths of the spectral light beams 290S and 290L from the dispersing portion 150 to the imaging lens 160 including a grating so that an optical action as described below is developed.

Reflection optical axes of the irradiation light beams 220S and 220L corresponding to the selected excitation light beam S are selectively defined by the mirror 152 and the dichroic mirror 151. The optical paths that are displaced as the excitation wavelength is switched become closer to each other and the distance between projection positions becomes shorter in a case where the dichroic mirror 151 is inserted to the side of a plane of incidence on the mirror 152 and a plane of reflection from the mirror 152 than in a case where the dichroic mirror 151 is not inserted to the side of the planes. In other words, the dichroic mirror 151 is situated in front of the plane of incidence on the mirror 152 and the plane of reflection from the mirror 152 and is tilted at a predetermined angle θc from the mirror 152 so that the optical paths that are displaced as the excitation wavelength changes become closer to each other and the distance between projection positions becomes shorter.

For example, a distance between the projection positions of the spectral light beams 290S and 290L corresponding to a predetermined wavenumber shift w1 (Raman shift) on the imaging portion 170 in a case where the projection positions are displaced as the excitation wavelength S is switched (457 nm, 633 nm) will be referred to as "distance Δf". The predetermined wavenumber shift w1 is selected from a target identification range as desired, and a representative of the predetermined wavenumber shift w1 according to the present embodiment is 2000 cm$^{-1}$.

Further, the distance between the optical paths of the spectral light beams 290S and 290L corresponding to the predetermined wavenumber shift w1 through the imaging lens 160 in a case where the optical paths are displaced as the excitation wavelength S is switched will be referred to as "distance Δi".

The identification apparatus 1000 according to the present embodiment is configured so that the distance Δf between the projection positions on the imaging portion 170 due to the optical paths of the spectral light beams 290S and 290L being changed as a result of switching the excitation wavelength S is shorter than the distance Δi between the optical paths through the imaging lens 160. Specifically, a spectral light beam 290S(L)_w1 corresponding to the wavenumber shift w1 and dispersed by the dispersing portion 150 is reflected by the mirrors 152 and 151 so that the distance Δf between the projection positions on the imaging portion 170 is shorter than the distance Δi between the optical paths through the imaging lens 160. While a target identification band TIB is set to 1600 cm$^{-1}$ to 3100 cm$^{-1}$, a similar effect is still produced even in a case where another band is selected. The imaging lens 160 can be replaced with an imaging mirror (not illustrated). The imaging lens 160 and the imaging mirror are sometimes referred to as "imaging optical element".

Since the light source 25 of the identification apparatus 1000 is configured to avoid simultaneous collection of the secondary light beams 240S and 240L, only one of the spectral images 280S and 280L is projected to the imaging portion 170 at the same time point. Hereinafter, the secondary light beams 240S and 240L dispersed by the dispersing portion 150 will be described as the spectral light beams 290S and 290L.

FIG. 2B is a view illustrating a plane where the dispersing portion 150 disperses wavelength components of light into a fan-like shape, i.e., a plane where an angle of a light beam exiting the dispersing portion 150 is changed dependently on the wavelength, when viewed from above in a vertical direction.

According to the present embodiment, the dispersing portion 150 is a grating, so that FIG. 2B can also be described as a view illustrating a plane where a diffraction angle is changed dependently on the wavelength when viewed from above in the vertical direction. An axis that extends upward in the vertical direction, i.e., an axis that is vertical to this sheet and faces front, will be referred to as "y-axis". An axis that is vertical to the y-axis and extends in a direction of a periodic structure of the grating, e.g., a direction in which grooves cut along the y-axis are repeated, will be referred to as "u-axis". An axis that is vertical to the ay-plane and is in an orientation of light transmission will be referred to as "p-axis". A flat-plate type grating corresponds to the ay-plane, and the 3-axis is vertical to the grating. Hereinafter, the dispersing portion 150 is sometimes referred to as "grating 150".

Figure 6A:
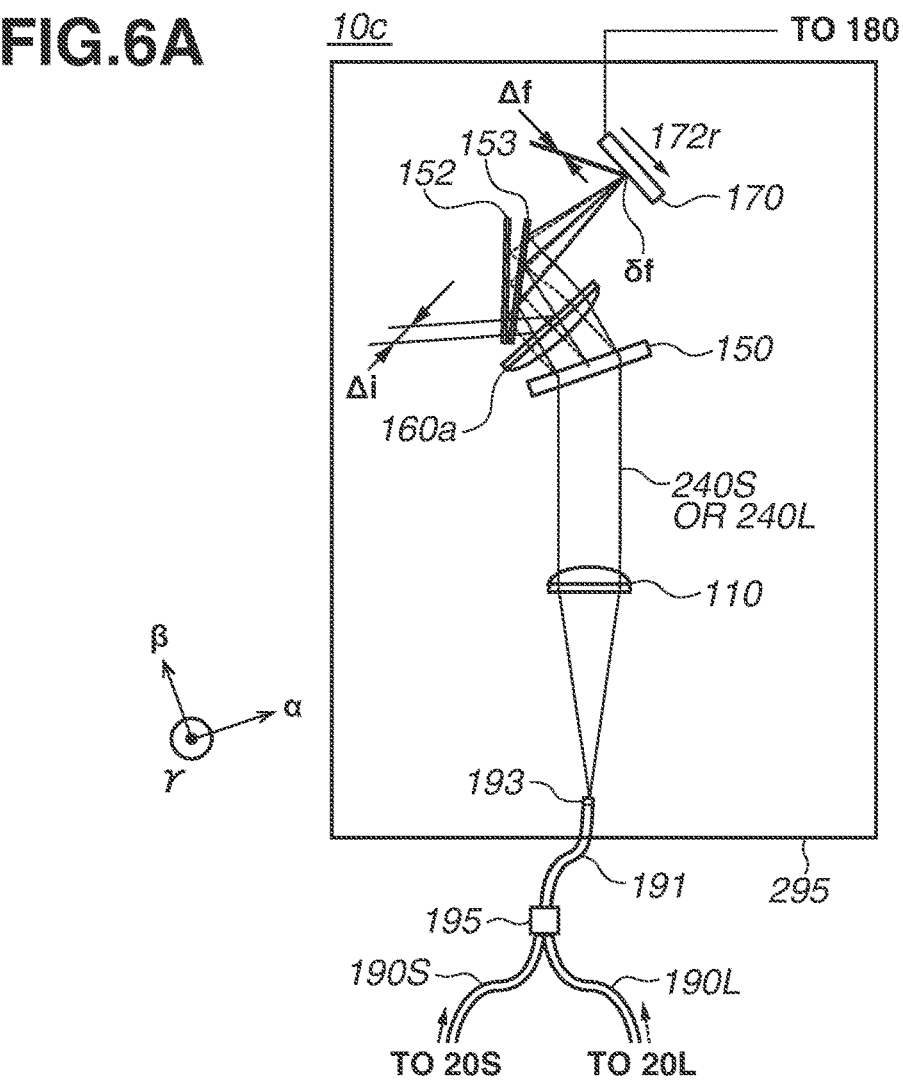
FIG. 6A is a view illustrating a schematic configuration of an image information acquisition portion according to a fourth embodiment.
Figure 6B:
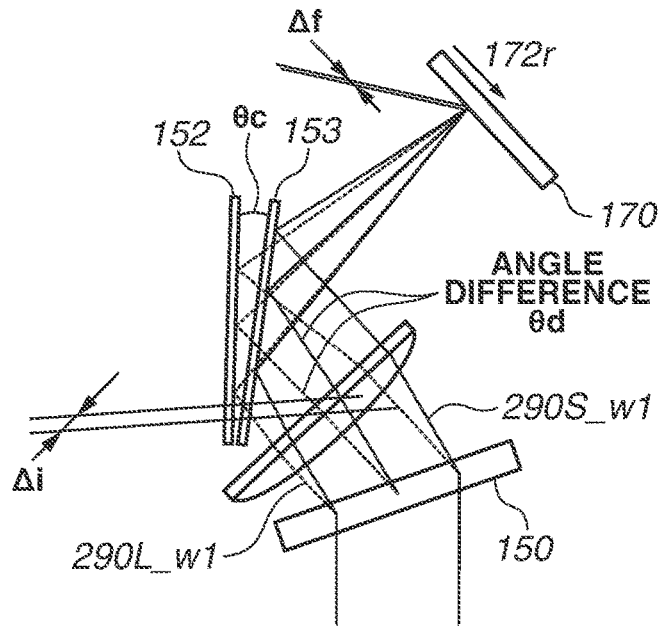
FIG. 6B is a view illustrating spectra projected to an imaging device.

In FIG. 2B, first, the secondary light beam 240S travels through the optical fiber 190S, and the secondary light beam 240L travels through the optical fiber 190L. The secondary light beams 240S and 240L join at the coupler 195 and then travel through the light guiding portion 191. After exiting the light exit end 193 of the light guiding portion 191, the secondary light beams 240S and 240L pass through the collimating lens 110 and are collimated into substantially parallel light beams. The substantially parallel light beams include parallel light beams. Then, the secondary light beams 240S and 240L as the parallel light beams enter the grating 150, and since the secondary light beams 240S and 240L have different wavelengths, the secondary light beams 240S and 240L are diffracted at a different angle from each other as illustrated in FIG. 6B. A transmission-type volume phase holographic grating (VPHG) having a refractive index period can be used as the grating 150. The grating 150 desirably has high diffraction efficiency with respect to both the secondary light beams 240S and 240L. In a case where the grating 150 disperses the secondary light beams 240S and 240L by primary diffraction, a peak of the wavelength-dependent diffraction efficiency is desirably between the wavelength bands of the secondary light beams 240S and 240L (near the middle).

In FIG. 2B, the optical paths after the dispersing portion 150 (grating 150) are illustrated focusing on spectral light beams 290S_w1 and 290L_w1 included in diffraction light beams of the secondary light beams 240S and 240L and corresponding to the same wavenumber shift. The attached letter w1 indicates that the corresponding light has the specific wavenumber shift w1. The spectral light beams 290S_w1 and 290L_w1 having a different wavelength from each other are diffracted at a different angle from each other, so that a difference θd in angle change (i.e., diffraction angle difference θd) due to the diffraction arises between spectral light beams 290S_w1 and 290L_w1.

The dichroic mirror 151 and the mirror 152 are situated adjacently along the optical paths to form an angle θc between the dichroic mirror 151 and the mirror 152 on the up-plane as illustrated in FIG. 2B. The dichroic mirror 151 reflects one of the secondary light beams 240S and 240L while transmitting the other. The dichroic mirror 151 according to the present embodiment is a short-pass beam splitter (SPBS) 151 configured to transmit the spectral light beam 290S and reflect the spectral light beam 290L. Hereinafter, the dichroic mirror 151 is sometimes referred to as "SPBS 151".

The SPBS 151 according to the present embodiment is an optical element that guides light to the dispersing portion 150 configured to disperse Stokes light, so that the SPBS 151 has filtering characteristics to reflect longer wavelengths and transmit shorter wavelengths. A filtering threshold wavelength λsc for the dichroic mirror 151 is set within a wavelength band between an upper limit value ksu of a wavenumber shift k of the target identification band TIB of an excitation wavelength λS and a lower limit value kll of the wavenumber shift k of the target identification band TIB of an excitation wavelength λL. Specifically, in a case where λS (nm), λL (nm), ksu (cm$^{-1}$), and kll (cm$^{-1}$) are given, lower and upper limits of λsc (nm) are set to satisfy the following general formulas (1), (2), and (3).

$$\text{Lower limit } \lambda sc < \lambda sc < \text{upper limit } \lambda sc \qquad (1),$$

$$10^7/\text{lower limit } \lambda sc = 10^7/\lambda S - ksu \qquad (2), \text{ and}$$

$$10^7/\text{upper limit } \lambda sc = 10^7/\lambda L - kll \qquad (3).$$

FIG. 3B illustrates a case where the upper limit value ksu of the wavenumber shift k of the target identification band TIB is 3100 cm$^{-1}$ and the lower limit value kll of the wavenumber shift k of the target identification band TIB is 1600 cm$^{-1}$.

The spectral light beam 290L reflected by the SPBS 151 enters the imaging lens 160.

Meanwhile, the spectral light beam 290S transmitted through the SPBS 151 is reflected by the mirror 152, is transmitted through the SPBS 151 again, and enters the imaging lens 160. The SPBS 151 is tilted at an angle θc with respect to the mirror 152 toward an upstream side (short wavelength side) of the direction 172r of the element array of the imaging portion 170. Due to the angle difference θc, a difference θo in angle of incidence on the imaging lens 160 between the spectral light beams 290S_w1 and 290L_w1 becomes smaller than the diffraction angle difference θd. As a result, the distance Δi between the optical paths of the spectral light beams 290S_w1 and 290L_w1 traveling through the imaging lens 160 of the identification apparatus 1000 including the SPBS 151 according to the present embodiment becomes shorter than a difference $\Delta ic$ in the configuration without the SPBS 151. This difference can be understood from FIGS. 2C and 2E. Furthermore, as a result, the distance $\Delta f$ corresponding to the difference between projection positions of the spectral light beams 290S_w1 and 290L_w1 on the imaging portion 170 of the identification apparatus 1000 including the SPBS 151 according to the present embodiment becomes shorter than a difference $\Delta fc$ in the configuration without the SPBS 151. This difference can be understood from FIGS. 2D and 2F. In FIGS. 2D and 2F and FIGS. 4A, 4C, 5A, 5C, and 6A described below, the differences $\Delta f$ and $\Delta fc$ are illustrated on an imaging plane of the imaging portion 170 and the differences $\Delta i$ and $\Delta ic$ on a main plane of the imaging lens 160 using parallel auxiliary lines.

Further, as illustrated in FIG. 2D, the distance $\Delta f$ corresponding to the difference between the projection positions of the spectral light beams 290S_w1 and 290L_w1 on the imaging portion 170 is shorter than the distance $\Delta i$ between the optical paths of the spectral light beams 290S_w1 and 290L_w1 through the imaging lens 160. In other words, the SPBS 151 is situated so that the distance $\Delta f$ between the projection positions of the spectral light beams 290S_w1 and 290L_w1 on the imaging portion 170 becomes shorter than the distance $\Delta i$ between the optical paths of the spectral light beams traveling through the imaging lens 160 as illustrated in FIG. 2D. An arrangement in which the target identification band TIB includes the wavenumber shift w1 that satisfies $\Delta f=0$ indicates that the projection spectral images 280S and 280L contain a wavenumber at which the spectral light beams 290S and 290L form an image on the photo detection element of the imaging portion 170 of the corresponding element number.

Further, wavelength-selectively shifting the reflection direction of the dichroic mirror 151 (SPBS 151) has an effect on the wavelength band of spectral light beams having a longer wavelength than the filtering wavelength $\lambda sc$ and on entire light beams. Thus, while the differences $\Delta i$ and $\Delta f$ are described based on the central optical paths of the two spectral light beams 290S_w1 and 290L_w1 having a different excitation wavelength S from each other, the differences $\Delta i$ and $\Delta f$ remain the same as those of the central optical paths regardless of which optical paths in the spectral light beams 290S_w1 and 290L_w1 are cut. Further, while the differences $\Delta i$ and $\Delta f$ are described based on the wavenumber shift w1 of the two spectral light beams 290S_w1 and 290L_w1 having a different excitation wavelength S from each other, the wavenumber shift w1 remains the same regardless of which wavelength corresponding to the wavenumber in the target identification band TIB is cut and used as a representative. Specifically, the central optical paths and the wavenumber shift w1 of the spectral light beams 290S and 290L represent other optical paths and other wavenumber shifts, for simplification of description.

Next, use efficiency of the imaging portion 170 of the identification apparatus 1000 according to the present embodiment will be described below with reference to FIGS. 3A to 3D.

FIG. 3A illustrates how the spectral light beam 290S(L) is projected as the spectral image 280S(L) to an effective imaging region of the imaging portion 170 via the optical system according to the present embodiment and a schematic configuration of the imaging portion 170. FIG. 3B is a diagram illustrating the target identification band TIB and the wavelengths of the spectral light beams 290S_w1 and 290L_w1 corresponding to the wavenumber shift w1 of $2000\ cm^{-1}$ specified in the target identification band TIB.

FIG. 3C is a diagram illustrating the projection positions of the spectral light beams 290S_w1 and 290L_w1 on the imaging portion 170 in the form in which the SPBS 151 is provided according to the present embodiment. FIG. 3D is a diagram illustrating the projection positions of the spectral light beams 290Sc_w1 and 290Lc_w1 on the imaging portion 170 of an identification apparatus according to a reference embodiment that is similar to the first embodiment except that the SPBS 151 is not situated. In FIGS. 3C and 3D, each projection position on the imaging portion 170 is specified by a row direction (172r) element number. In other words, FIG. 3B is a diagram illustrating the excitation wavelength dependence of optical spectrum wavelengths corresponding to a specific wavenumber shift. In other words, FIGS. 3C and 3D are diagrams illustrating projection positions of spectral images according to the first embodiment with the dichroic mirror 151 and the reference embodiment without the dichroic mirror 151.

The identification apparatus 1000 with the dichroic mirror 151 according to the present embodiment acquires the spectral images 280S and 280L corresponding to excitation light beams $\lambda S$ and $\lambda L$ using 1024 elements from the $1^{st}$ to the $1024^{th}$ elements with respect to the target identification band TIB as illustrated in FIG. 3C. On the other hand, an identification apparatus (not illustrated) without the dichroic mirror 151 according to the reference embodiment uses 3294 elements from the $269^{th}$ to $3562^{nd}$ elements with respect to the target identification band TIB to acquire the spectral images 280Sc and 280Lc. Specifically, the efficiency of use of the imaging portion 170 by the identification apparatus 1000 according to the present embodiment is 3.29 times higher than the identification apparatus according to the reference embodiment.

Further, the increase of the efficiency of use of the imaging portion 170 is also explainable in terms of the specific wavenumber shift w1 similarly to the target identification band TIB. The identification apparatus 1000 with the dichroic mirror 151 according to the present embodiment uses 142 elements for the difference between the projection positions of the spectral images 280S and 280L corresponding to the excitation light beams $\lambda S$ and $\lambda L$ with respect to the wavenumber shift w1 ($2000\ cm^{-1}$) as illustrated in FIG. 3C. On the other hand, the identification apparatus (not illustrated) without the dichroic mirror 151 according to the reference embodiment uses 2398 elements for the difference between the projection positions of the spectral images 280Sc and 280Lc corresponding to the excitation light beams $\lambda S$ and $\lambda L$ with respect to the wavenumber shift w1 ($2000\ cm^{-1}$). Specifically, the efficiency of use of the imaging portion 170 by the identification apparatus 1000 according to the present embodiment is clearly increased compared to the identification apparatus according to the reference embodiment.

The spectral images 280S and 280L are projected to overlap each other at least partially in a column direction 172c of the imaging portion 170 as illustrated in FIG. 3A. To use the imaging portion 170 effectively, the spectral images 280S and 280L are desirably projected so that the spectral images 280S and 280L are parallel to each other in the row direction 172r and the overlap in the column direction 172c increases. More desirably, at least one of the spectral images 280S and 280L includes the other in the column direction 172c.

The combination of the dichroic mirror 151 and the mirror 152 of the spectral image acquisition portion 10 according to the present embodiment can be a long-pass beam splitter and another mirror.

(Imaging Portion)

The imaging portion 170 uses an imaging device including two-dimensionally arranged photo detection elements, such as a complementary metal oxide semiconductor (CMOS) imaging device or a charge-coupled device (CCD) imaging device. A plurality of photo detection elements 350 of the imaging portion 170 according to the present embodiment is arranged in matrix, whereas in a case of a delta array, row and column directions are associated with two of three axial directions or are associated with one of the three axial directions and a synthesized direction generated by synthesizing the remaining two axial directions.

The identification apparatus 1000 identifies properties of the test sample 900i while the conveyance portion 200 conveys the test sample 900i, and the discrimination device 300 described below discriminates the test sample 900i based on the identification result. Thus, the conveyance velocity vc of the conveyance portion 200 is desirably increased in order to increase a throughput of the sorting processing by the identification apparatus 1000. The spectral images 280S and 280L projected on the imaging portion 170 are formed by Raman scattered light beams generated from the test sample 900i moved on the conveyance surface 201. Thus, the spectral images 280S and 280L can be formed on the imaging portion 170 while the test sample 900i being conveyed is in the irradiation regions of the irradiation light beams (convergent light beam) 220S and 220L from the irradiation portions 22S and 22L. For example, in a case where the conveyance velocity vc of the conveyance portion 200 is 2 m/second and the length of the test sample 900i in the conveyance direction dc is 10 mm, the maximum time during which the imaging portion 170 can detect a spectral image formed by Raman scattered light generated from the test sample 900i is 5 milliseconds. At this time, the test sample 900i may lie on both the irradiation regions of the irradiation light beams 220S and 220L depending on the relationship between an interval between the irradiation portions 22S and 22L and the length of the test sample 900i in the conveyance direction dc. Only one of the irradiation light beams 220S and 220L is emitted to the test sample 900i at each time point. Therefore, in a case where both the spectral images 280S and 280L are to be acquired, the time during which each of the spectral images 280S and 280L is detectable is shorter than 5 milliseconds. Thus, the imaging portion 170 is desirably a device capable of imaging continuously at high frame rate, for example, desirably 400 fps or higher in the above-described example. An imaging portion with high frame rate is a CMOS image sensor. Thus, the imaging portion 170 is desirably a CMOS image sensor.

Further, since the intensity of Raman scattered light generated from the test sample 900i is significantly low as described above, the intensity of light incident on each element of the photo detection elements 350 of the imaging portion 170 is also significantly low. Thus, the imaging portion 170 that has high sensitivity to each wavenumber region of the spectral images 280S and 280L is desirably used. In general, a rolling shutter image sensor has a simpler pixel structure and a higher aperture ratio than a global shutter image sensor, and photoelectric conversion elements can be enlarged. This can increase sensitivity and dynamic range. Further, having a simple pixel structure, a rolling shutter image sensor is more advantageous than a global shutter image sensor in that costs are low. For the foregoing reasons, a rolling shutter CMOS image sensor is used as the imaging portion 170 according to the present embodiment.

The imaging portion 170 can use a rolling reset image sensor that performs a sequential reset operation on the array of the photo detection elements 350 row by row. This maximizes the exposure time of each row of the array of the photo detection elements 350 and increases sensitivity.

The imaging portion 170 according to the present embodiment has a crop reading function of reading a specific row in a light receiving portion 171 where the photo detection elements 350 are arranged two-dimensionally in the row direction 172r and the column direction 172c as illustrated in FIG. 3A. Having the function, the imaging portion 170 performs an operation of reading a specific row in the light receiving portion 171 corresponding to the light collecting portion 20 using morphological information Fi from a prior information acquisition portion 70 described below in a case where an arrival of the test sample 900i at a light collectable region of the light collecting portion 20 is detected.

The imaging portion 170 includes a reading circuit 173, a horizontal scanning circuit 174, a vertical scanning circuit 175, and an output circuit 176 in FIG. 3A and sequentially reads signals row by row from a plurality of pixels arranged in matrix. The vertical scanning circuit 175 selects a row in the light receiving portion 171 and drives the selected row. The reading circuit 173 reads signals output from the pixels of the row selected by the vertical scanning circuit 175 and transfers the read signals to the output circuit 176 based on control by the horizontal scanning circuit 174. The reading in a main scanning direction (row direction) is performed in this way. Further, the vertical scanning circuit 175 shifts the selected row, and the reading circuit 173 performs reading in the main scanning direction based on control by the horizontal scanning circuit 174. This is repeated while the selected row is shifted in a sub-scanning direction (column direction) so that signals are read from the entire light receiving portion 171. The read signals are output as output signals via an output end 177 of the output circuit 176 to a material information reference portion 180 provided outside the imaging portion 170. At this time, the scanning in the main scanning direction is performed at high speed while the scanning in the sub-scanning direction is performed at lower speed than the scanning in the main scanning direction.

The imaging portion 170 acquires spectral information Si about the test sample 900i considering the captured spectral image 280S or 280L, photoelectric conversion characteristics of the image sensor of the imaging portion 170, and transmission characteristics of the optical system. Furthermore, the imaging portion 170 can also acquire polarization information including circular dichroism and optical rotatory dispersion.

The light exit end 193, the dispersing portion 150, the imaging lens 160, and the imaging portion 170 are stored in a lightproof container 295 to reduce effects of noise light from background and leakages of laser light to the outside of the apparatus.

(Material Information Reference Portion)

The spectral information acquisition portion 100 includes the material information reference portion 180 configured to acquire material information Mi about the test sample 900i based on the spectral information Si acquired by the spectral image acquisition portion 10. The material information reference portion 180 refers to a material database (not illustrated) storing reference data on Raman scattered light and acquires the material information Mi indicating materials contained in the test sample 900i based on a similarity between the spectral information Si and the reference data. The material information reference portion 180 according to the present embodiment desirably includes intensity information about the light beam 290S_w1 or 290L_w1 having the specific wavenumber shift w1 as illustrated in FIG. 3B as an example in the spectral information Si for use in similarity calculation. The spectral information acquisition portion 100 stores at least one of the spectral information Si and the material information Mi in a first storage unit 60 via an instruction unit 40 described below.

Further, the material database that the material information reference portion 180 refers to can be stored on a local server of the identification apparatus 1000 or on a remote server that is accessible via the Internet or Intranet. Information about a predetermined molecular bond that is stored in the material database includes information about an eigenfrequency of the molecular bond.

The spectral information acquisition portion 100 acquires the material information Mi about mixtures of materials, additives, and impurity components that are contained in the test sample 900i as described above.

(Prior Information Acquisition Portion)

The prior information acquisition portion 70 includes a camera 76 and an image processing unit 78 as illustrated in FIG. 1. The camera 76 is arranged so that an imaging field of view 700 overlaps the conveyance portion 200. The image processing unit 78 performs image processing on test sample images captured by the camera 76. Using the camera 76 and the image processing unit 78, the prior information acquisition portion 70 acquires the morphological information Fi and color information Ci about the test sample 900i as prior information for the spectroscopic measurement by the spectral information acquisition portion 100, i.e., prior information with respect to the spectral information Si and the material information Mi about the test sample 900i. Like the material information Mi, the morphological information Fi and the color information Ci are also information about properties of the test sample 900i.

The image processing unit 78 performs image processing such as calculation of color space components, shading processing, and outline extraction and acquires the length of the test sample 900i in the conveyance direction dc, the shape of the test sample 900i, and a material mixture level of the test sample 900i as the morphological information Fi and acquires brightness, saturation, hue, and fluorescent light intensity as the color information Ci. The image processing unit 78 is also described as an element that performs processing to acquire size and color information about each test sample 900i. The prior information acquisition portion 70 stores at least one of the morphological information Fi and the color information Ci in a third storage unit 90 via the instruction unit 40 described below.

The prior information acquisition portion 70 can use a monochrome camera, a color camera, a multi-spectral camera, or a hyper-spectral camera as the camera 76. The prior information acquisition portion 70 can further include an illumination device such as a black light, light emitting diodes (LEDs) of each color, a fluorescent light, or an incandescent lamp. The prior information acquisition portion 70 can include a photointerrupter or a laser interferometer for acquiring mainly the morphological information Fi and a photodiode for acquiring mainly the color information Ci in place of the camera 76.

Further, the prior information acquisition portion 70 can be included in the spectral information acquisition portion 100. In this case, the light collecting units 27S and 27L and the spectral image acquisition portion 10 replace the camera 76 and the image processing unit 78. By adding the functions of the image processing unit 78 to the imaging portion 170, at least one of the color information Ci and the morphological information Fi about the test sample 900i is acquired and an instruction to control emission of light from the light source 25 is generated via the instruction unit 40. The spectral information Si is acquired using the generated light of the excitation wavelength.

The prior information acquisition portion 70 is an optional element of the identification apparatus 1000 that is selectively used as needed and can be omitted.

(Acquisition Portion)

The acquisition portion 30 acquires, for each test sample 900i, identification information Di about whether the test sample 900i is a target test sample or a non-target test sample based on the material information Mi or the spectral information Si acquired by the spectral information acquisition portion 100 and the morphological information Fi and the color information Ci acquired by the prior information acquisition portion 70 as illustrated in FIG. 1. The acquisition portion 30 outputs the acquired identification information Di to the instruction unit 40.

In other words, the acquisition portion 30 identifies properties of the test sample 900i based on a spectrum of Raman scattered light contained in secondary light beams collected by the light collecting portions 20S and 20L. In other words, the acquisition portion 30 according to the present embodiment identifies properties of each test sample 900i based on a test sample image acquired from the camera 76 and a spectrum of Raman scattered light contained in secondary light beams collected by the light collecting portion 20.

(Control Unit)

The identification apparatus 1000 includes the discrimination device 300 and a control unit 400. The control unit 400 controls the light source 25. The control unit 400 includes the instruction unit 40 and a second storage unit 80. The instruction unit 40 controls a discrimination operation of the discrimination device 300 based on properties of each test sample 900i. The second storage unit 80 stores a condition for the discrimination operation control. The instruction unit 40 further controls emission of light from the light source 25 based on the prior information about each the test sample 900i. Thus, the control unit 400 includes the third storage unit 90 for storing a condition of the control of light emission from the light source 25. The third storage unit 90 is an element subsidiary to the prior information acquisition portion 70, i.e., an element that is selectively used as needed, and can be omitted from the identification apparatus 1000. The control unit 400 includes a display portion 140 configured to provide a graphical user interface (GUI) via which a user can select a control condition. The display portion 140 sometimes displays information acquired by the acquisition portion 30.

(Storage Unit)

The first storage unit 60 is configured to store, for each the test sample 900i, the identification information Di, the material information Mi, the spectral information Si, the morphological information Fi, and the color information Ci in association with the time points ti_S and ti_L at which the test sample 900i pass through the irradiation regions of the irradiation light beams 220S and 220L.

The second storage unit 80 is configured to store, for each the test sample 900i, a control condition for controlling the intensity Is of the discrimination operation of the discrimination device 300 correspondingly to the identification information Di (in other words, a correspondence relationship between the intensity Is and the identification information Di).

The third storage unit 90 is configured to store, for each the test sample 900i, a control condition for controlling wavelengths and intensities of light beams generated by the light source 25 and patterns of switching the wavelengths and intensities correspondingly to the color information Ci and the morphological information Fi (in other words, a correspondence relationship between the wavelengths and intensities and the patterns and the color information Ci and the morphological information Fi). An example of the control condition is that the excitation light beam S with a higher intensity than the excitation light beam L is emitted in a case where the brightness of the color information Ci is less than a threshold value whereas the excitation light beam L with a lower intensity than the excitation light beam S is emitted in a case where the brightness of the color information Ci is greater than or equal to the threshold value. Another example is that the excitation light beam L is emitted in a case where the fluorescent light intensity of the color information Ci is higher than or equal to a threshold value whereas the excitation light beam S is emitted in a case where the fluorescent light intensity of the color information Ci is lower than the threshold value. Another example is that the excitation light beam S is emitted in a case where the hue of the color information Ci indicates a cold color value whereas the excitation light beam L is emitted in a case where the hue of the color information Ci indicates a warm color value.

In an example where the wavelength or intensity of light is switched at least once while the test sample 900i passes through the irradiation region, first the excitation light beam L is emitted for a long time and then the excitation light beam S is emitted for a short time in a case where the brightness is higher than a threshold value. On the other hand, in a case where the brightness is lower than the threshold value, first the excitation light beam S is emitted for a long time and then the excitation light beam L is emitted for a short time. Another example is that in a case where the brightness is intermediate and the saturation has a low value, the intensity is gradually increased while the excitation light beam S and the excitation light beam L are alternately switched.

The formats of the control conditions in the second storage unit 80 and the third storage unit 90 include a referable table, an algebraically-expressed general formula, and statistical information trained by machine learning.

(Instruction Unit)

The instruction unit 40 estimates a time point at which the test sample 900i passes through a discrimination processing region where the discrimination device 300 performs discrimination processing on the test sample 900i based on the identification information Di transmitted from the acquisition portion 30 considering the materials and size of the test sample 900i, and the instruction unit 40 generates an instruction to control the discrimination operation of the discrimination device 300. The time point at which the test sample 900i passes through the discrimination processing region can be estimated based on at least one of the morphological information Fi from the prior information acquisition portion 70, a signal from the spectral information acquisition portion 100, a signal from a test sample sensor (not illustrated) of the conveyance portion 200, and a signal from a conveyance velocity sensor (not illustrated).

The instruction unit 40 further generates an instruction to control light emission from the light source 25 so that a light beam having an appropriate excitation wavelength and an appropriate intensity is emitted to the test sample 900i at an appropriate timing based on the morphological information Fi and the color information Ci transmitted from the prior information acquisition portion 70. As to the light emission timing, the instruction unit 40 estimates a time point at which the test sample 900i passes through the irradiation regions of the irradiation light beam 220S and 220L based on the morphological information Fi, a signal from the test sample sensor of the conveyance portion 200, or a signal from the conveyance velocity sensor. As to the wavelength and intensity of light to be emitted, the instruction unit 40 refers to the control condition stored in the third storage unit 90 and determines an excitation wavelength and intensity corresponding to the color information Ci and the morphological information Fi and a pattern of switching the excitation wavelength and intensity. The instruction unit 40 may generate an instruction to control light emission from the light source 25 in synchronization with a reset operation of the imaging portion 170.

The instruction unit 40 can generate an instruction to control light emission from the light source 25 even in a case where the identification apparatus 1000 does not include the prior information acquisition portion 70 and the third storage unit 90. An example is a case where an instruction to emit the excitation light beam S and the excitation light beam L alternately and periodically (e.g., in synchronization with a reset operation of the imaging portion 170) is generated regardless of the prior information.

(Discrimination Device)

The discrimination device 300 includes an air nozzle 330 and a discrimination control unit 340 as illustrated in FIG. 1. The air nozzle 330 discharges compressed air for a predetermined discharge time at a discharge velocity at a discharge flow rate. The discrimination control unit 340 controls a solenoid valve (not illustrated) of the air nozzle 330. The discrimination control unit 340 receives control signals from the instruction unit 40 of the identification apparatus 1000. The discrimination operation of the discrimination device 300 according to the present embodiment includes an operation of discharging fluids. The fluids to be discharged include air, dry nitrogen, inert gases such as noble gases, liquids, and gas-liquid mixed fluids (aerosol). The discrimination device 300 collects the test sample 900i into a target collection basket 620, a non-target collection basket 600, or a non-target collection basket 640 according to properties of the test sample 900i based on control signals from the instruction unit 40.

The fluid discharge device of the discrimination device 300 can be replaced with a flap gate that opens and closes at a predetermined angular velocity or a shutter that is opened and closed at a predetermined velocity. Further, the prior information acquisition portion 70, the spectral information acquisition portion 100, and the discrimination device 300 of the identification apparatus 1000 and the components thereof can be arranged in parallel at different positions in a conveyance width direction of the conveyance portion 200 to aggregate the system and increase processing speed. The discrimination device 300 is also referred to as a discrimination portion 300 as an element of the identification apparatus 1000.

(Conveyance Portion)

The conveyance portion 200 is a conveyance unit that conveys the plurality of test samples 900i (i=1, 2, . . . ) fed sequentially from the feeder 500 at the predetermined conveyance velocity vc in the conveyance direction dc (x direction in FIG. 1). The conveyance portion 200 and the feeder 500 constitute the conveyance unit that conveys the test samples 900i.

The conveyance portion 200 according to the present embodiment includes the conveyor belt that conveys the test samples 900i fed from the feeder 500 in the conveyance direction dc at the velocity vc, and the conveyance portion 200 conveys the test samples 900i linearly on the conveyance surface 201. The conveyance portion 200 can be replaced with a turntable feeder that spirally conveys a test sample outwardly, a vibrating feeder including a vibrating device for moving a test sample in a predetermined direction, or a conveyor roller consisting of a plurality of rollers according to a modified form.

Since the conveyance portion 200 moves the test sample 900i so that the test sample 900i passes through the imaging field of view 700 of the camera 76, the conveyance portion 200 is also described as the placement portion 200 with respect to the prior information acquisition portion 70. Similarly, since the conveyance portion 200 conveys the test sample 900i so that the test sample 900i passes through an effective light collecting region of the light collecting portion 20, the conveyance portion 200 is also described as the placement portion 200 with respect to the light collecting portions 20S and 20L. Similarly, since the conveyance portion 200 moves the test sample 900i so that the test sample 900i passes through a region to be irradiated by the irradiation portions 22S and 22L, the conveyance portion 200 is also described as the placement portion 200 with respect to the irradiation portions 22S and 22L.

According to the present embodiment, the conveyance velocity vc of the conveyance portion 200 can be set to 0.1 m/second to 5 m/second for the conveyor belt.

Further, performing classification processing to filter the test sample 900i by shape and size as pre-processing before the feeding by the feeder 500 is also a modified form of an identification method using the identification apparatus 1000 according to the present embodiment. The classification processing is performed using a vibration conveyor, a vibration sieve machine, or a crushing and particle-size adjusting machine. Further, performing color separation processing to filter or separate the test sample 900i by color as pre-processing before the feeding by the feeder 500 is also a modified form of an identification method using the identification apparatus 1000. A machine such as a color filtering machine is used in color separation processing.

As described above, with the identification apparatus according to the first embodiment of the present invention, projection positions of optical spectra corresponding to irradiation light beams of different excitation wavelengths become closer to each other, and the efficiency of use of the components including the imaging portion is increased.

Figure 4A:
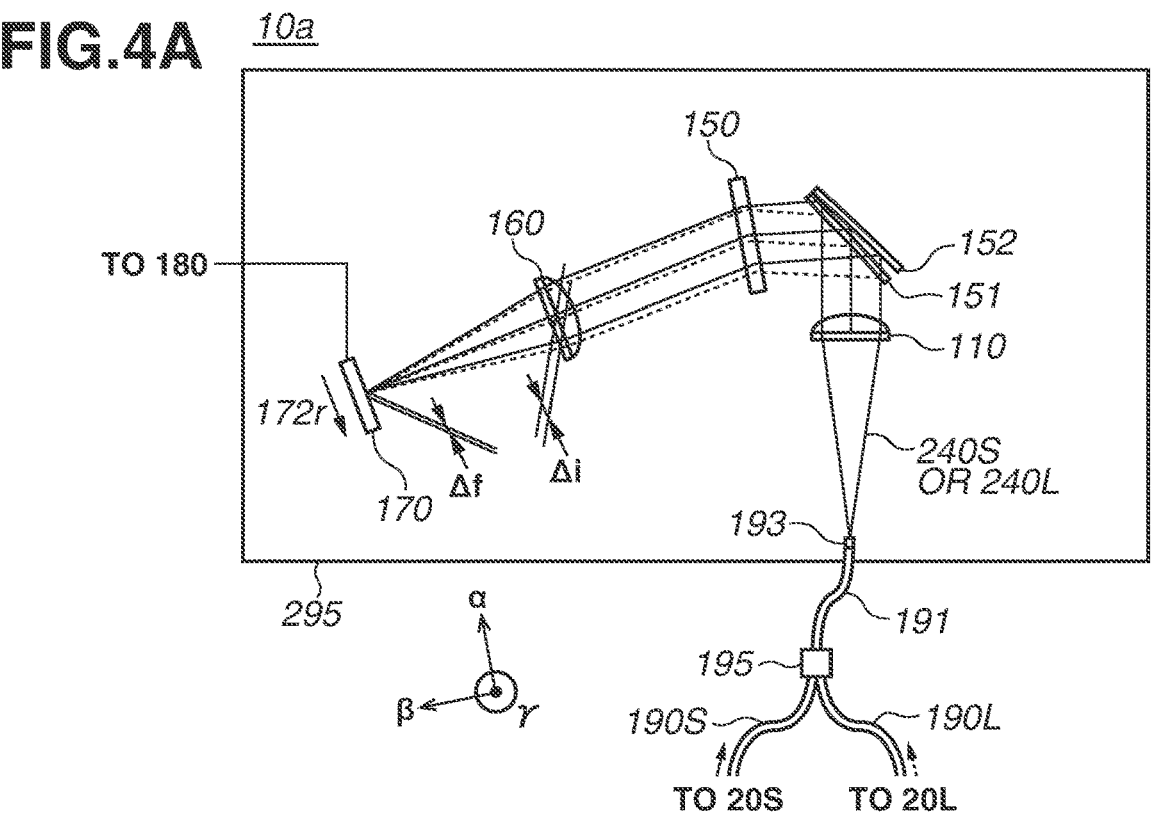
FIG. 4A is a view illustrating a schematic configuration of an image information acquisition portion according to a second embodiment.
Figure 4B:
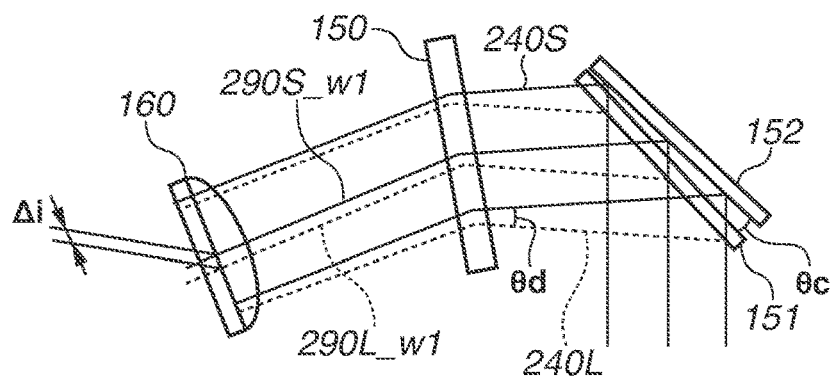
FIGS. 4B and 4C are partially enlarged views illustrating a projection optical system including a dichroic mirror.
Figure 4C:
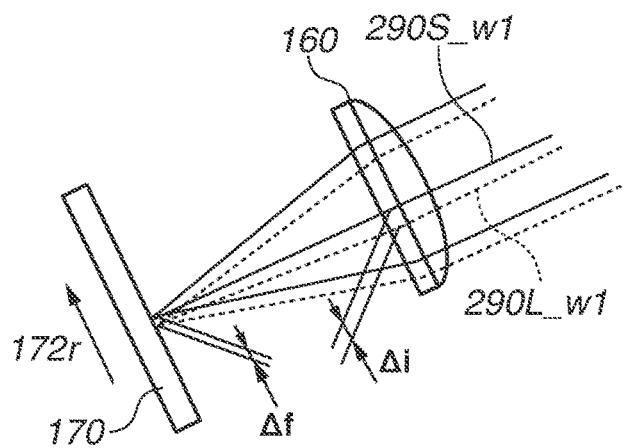

An identification apparatus according to a second embodiment will be described below with reference to FIGS. 4A, 4B, and 4C. FIG. 4A is a detailed view illustrating a spectral image acquisition portion 10a according to the second embodiment. FIG. 4B is an enlarged view illustrating a neighborhood of the mirror 152, the dispersing portion 150, and the imaging lens 160 to illustrate an effect of the dichroic mirror 151 according to the present embodiment. FIG. 4C is an enlarged view illustrating a neighborhood of the imaging lens 160 and the imaging portion 170 to illustrate an effect of the dichroic mirror 151 according to the present embodiment.

The spectral image acquisition portion 10a according to the present embodiment includes the dichroic mirror 151 and the mirror 152 on optical paths of the scattered light beams 240S and 240L and between the collimating lens 110 and the dispersing portion 150 as illustrated in FIGS. 4A to 4C. Further, the spectral image acquisition portion 10a includes the dichroic mirror 151 and the mirror 152 on optical paths of the scattered light beams 240S and 240L and between the light exit end 193 and the dispersing portion 150 as illustrated in FIGS. 4A to 4C. This is a difference from the spectral image acquisition portion 10 according to the first embodiment in which the dichroic mirror 151 and the mirror 152 are situated on the optical paths of the spectral light beams 290S and 290L and between the dispersing portion 150 and the imaging lens 160.

The spectral image acquisition portion 10a includes the light guiding portion 191 and the dichroic mirror 151 situated between the light exit end 193 and the imaging portion 170 as illustrated in FIG. 4A. The light guiding portion 191 includes the light exit end 193 configured to emit a secondary light beam guided from the light collecting portions 20S and 20L toward the dispersing portion 150. Further, the dichroic mirror 151 according to the present embodiment is situated between the light exit end 193 and the dispersing portion 150 and reflects one of the different scattered light beams 240S and 240L corresponding to the different excitation wavelengths S so that the optical paths of the scattered light beams 240S and 240L become closer to each other.

The dispersing portion 150 disperses the secondary light beams 240S and 240L collected by the light collecting portions 20S and 20L, and the spectral light beams 290S and 290L are each projected to the imaging portion 170 via the dichroic mirror 151, the mirror 152, and the imaging lens 160.

The spectral light beams 290S and 290L are projected to photo detection elements that are included in an effective imaging region of the imaging portion 170 and arranged along the row direction 172r. The imaging portion 170 receives the projected spectral light beams 290S and 290L by the photo detection element array of the imaging portion 170, which is arranged along the row direction 172r, and acquires the spectral images 280S and 280L. Specifically, the spectral image acquisition portion 10 of the identification apparatus 1000 according to the present embodiment uses the components of the optical system other than the mirror 152 and the dichroic mirror 151 for both the irradiation light beams 220S and 220L and the secondary light beams 240S and 240L corresponding to the different excitation wavelengths $\lambda S$ and $\lambda L$.

According to the present embodiment, the dichroic mirror 151 and the mirror 152 are situated on the optical paths from the collimating lens 110 to the dispersing portion 150 including the grating so that an optical action as described below is developed.

Reflection optical axes of the irradiation light beams 220S and 220L corresponding to the selected excitation light beam S are selectively defined by the mirror 152 and the dichroic mirror 151. The optical paths that are displaced as the excitation wavelength S changes become closer to each other and the distance between projection positions becomes shorter in a case where the dichroic mirror 151 is inserted to the side of a plane of incidence on the mirror 152 and a plane of reflection from the mirror 152 than in a case where the dichroic mirror 151 is not inserted to the side of the planes. In other words, the dichroic mirror 151 is situated in front of the plane of incidence on the mirror 152 and the plane of reflection from the mirror 152 and is tilted at a predetermined angle θc from the mirror 152 so that the optical paths that are displaced as the excitation wavelength changes become closer to each other and the distance between projection positions becomes shorter.

For example, a distance between the projection positions of the spectral light beams 290S and 290L corresponding to the predetermined wavenumber shift w1 (Raman shift) on the imaging portion 170 in a case where the projection positions are displaced as the excitation wavelength S is switched (457 nm, 633 nm) will be referred to as "distance Δf". The predetermined wavenumber shift w1 is selected from a target identification range as desired, and a representative of the predetermined wavenumber shift w1 according to the present embodiment is 2000 cm$^{-1}$.

Further, the distance between the optical paths of the spectral light beams 290S and 290L corresponding to the predetermined wavenumber shift w1 through the imaging lens 160 in a case where the optical paths are displaced as the excitation wavelength S is switched will be referred to as "distance Δi".

The identification apparatus 1000 according to the present embodiment is configured so that the distance Δf between the projection positions on the imaging portion 170 due to the optical paths of the spectral light beams 290S and 290L being changed as a result of switching the excitation wavelength S is shorter than the distance Δi between the optical paths through the imaging lens 160. This effect Δf<Δi can be clearly understood from FIGS. 4B and 4C. Specifically, the spectral light beam 290S(L)_w1 corresponding to the wavenumber shift w1 and dispersed by the dispersing portion 150 is reflected by the mirrors 152 and 151 so that the distance Δf between the projection positions on the imaging portion 170 is shorter than the distance Δi between the optical paths through the imaging lens 160. While the target identification band TIB is set to 1600 cm$^{-1}$ to 3100 cm$^{-1}$, a similar effect is still produced even in a case where another band is selected.

Further, the spectral image acquisition portion 10a is configured so that the incidence angles of the secondary light beams 240S and 240L incident on the dispersing portion 150 are different from each other. This may increase the dispersion efficiency of each of the scattered light beams 240S and 240L compared to the first embodiment.

Projection positions of optical spectra corresponding to irradiation light beams of different excitation wavelengths become closer to each other in the spectral image acquisition portion 10a of the identification apparatus 1000 according to the present embodiment, as in the spectral image acquisition portion 10 according to the first embodiment, and the efficiency of use of the components including the imaging portion 170 is increased. Specifically, projection positions of optical spectra corresponding to irradiation light beams of different excitation wavelengths become closer to each other in the identification apparatus according to the present embodiment, as in the identification apparatus 1000 according to the first embodiment, and the efficiency of use of the components including the imaging portion 170 is increased.

An identification apparatus according to a third embodiment will be described below with reference to FIGS. 5A to 5C. FIG. 5A is a detailed view illustrating a schematic configuration of the spectral image acquisition portion 10b of a spectral information acquisition portion of the identification apparatus according to the present embodiment. FIG. 5B is a view illustrating optical axes of a plurality of light exit ends 193S and 193L relating to a feature of the present embodiment to the dispersing portion 150. FIG. 5C is a view illustrating optical axes of spectral light beams traveling from the plurality of light exit ends 193S and 193L relating to a feature of the present embodiment through the dispersing portion 150 to form an image on the imaging portion 170.

(Spectral Image Acquisition Portion)

The spectral image acquisition portion 10b according to the present embodiment includes the irradiation portions 22S and 22L configured to emit a light beam from the light source 25 to the placement portion 200 where the test sample 900i is placed via the different optical paths 220S and 220L at different time points correspondingly to different excitation wavelengths S, as in the spectral image acquisition portion 10. Further, the irradiation portions 22S and 22L include the plurality of irradiation ends 260S and 260L (objective lens) corresponding to different excitation wavelengths S.

Further, the light collecting portions 20S and 20L of the spectral image acquisition portion 10b include a plurality of light collection ends 260S and 260L (objective lens) configured to collect light beams collected correspondingly to the different optical paths from the light collecting portions 20S and 20L. In other words, the irradiation ends 260S and 260L and the light collection ends 260S and 260L share the objective lenses for each excitation wavelength.

Further, the spectral image acquisition portion 10b includes light guiding portions 190S and 190L having the plurality of light exit ends 193S and 193L corresponding to the plurality of light collection ends 260S and 260L to emit light beams guided from the plurality of light collection ends 260S and 260L to the dispersing portion 150. One pair among the plurality of light exit ends 193S and 193L are situated at different positions from each other along a surface of the dispersing portion 150 where diffraction angles of spectral light beams are changed.

The distance Δf between the projection positions on the imaging portion 170 due to the optical paths of the spectral light beams 290S and 290L being changed as a result of switching the excitation wavelength S in the identification apparatus according to the present embodiment is reduced compared to an arrangement without a plurality of emission portions, as illustrated in FIGS. 5A to 5C. With the structure, the distance Δf between the projection positions on the imaging portion 170 due to the optical paths of the spectral light beams 290S and 290L being changed as a result of switching the excitation wavelength S becomes shorter than the distance Δi between the optical paths through the imaging lens 160. Specifically, the spectral light beam 290S(L)_w1 corresponding to the wavenumber shift w1 and dispersed by the dispersing portion 150 is reflected by the mirrors 152 and 151 so that the distance Δf between the projection positions on the imaging portion 170 becomes shorter than the distance Δi between the optical paths through the imaging lens. While the target identification band TIB is set to 1600 cm$^{-1}$ to 3100 cm$^{-1}$, a similar effect is produced even in a case where another band is selected.

The positions of the light exit ends 193S and 193L of the optical fibers 190L and 190S of the spectral image acquisition portion 10b can be different not only in a direction perpendicular to an optical axis 111 of the collimating lens 110 but also in a direction parallel to the optical axis 111 as illustrated in FIG. 5A. The light exit end 193S of the optical fiber 190S is situated closer by a distance δv to the collimating lens 110 than the light exit end 193L of the optical fiber 190L is. With this structure, the spectral image acquisition portion 10b according to the present embodiment can correct axial chromatic aberrations generated by the optical system following the collimating lens 110. Thus, a shift of a focus position (a positional shift of a focal point) of the spectral images 280S and 280L in the direction of an optical axis 161 of the imaging lens 160 is reduced. Specifically, a decrease in wavenumber resolutions of the spectral images 280S and 280L is prevented.

An identification apparatus according to a fourth embodiment will be described below with reference to FIGS. 6A and 6B. FIG. 6A is a detailed view illustrating a spectral image acquisition portion 10c according to the fourth embodiment. FIG. 6B is a view illustrating a relationship between photo detection element numbers of the photo detection elements arranged in the row direction 172r of the imaging portion 170 and wavenumbers of spectral images projected along the row direction 172r.

The spectral image acquisition portion 10c according to the present embodiment is different from the spectral image acquisition portions 10 and 10a according to the first and second embodiments in that the spectral image acquisition portion 10c includes a dichroic mirror 153 and the mirror 152 between the imaging lens 160 and the imaging portion 170 as illustrated in FIG. 6A. In other words, the spectral image acquisition portion 10c according to the present embodiment is a modified form of the spectral image acquisition portions 10 and 10a according to the first and second embodiments. The dichroic mirror 153 according to the present embodiment is situated to have the opposite wavelength selectivity to the dichroic mirrors 151 according to the first and second embodiments. Specifically, the dichroic mirror 153 according to the present embodiment has dispersion and reflection characteristics of transmitting long-wavelength light beams and reflecting short-wavelength light beams, whereas the dichroic mirrors 151 according to the first and second embodiments have dispersion and reflection characteristics of reflecting long-wavelength light beams and transmitting short-wavelength light beams.

The present embodiment produces an effect of improving the efficiency of use of the imaging portion 170 by the dichroic mirror 151 as in the first and second embodiments.

Figure 7A:
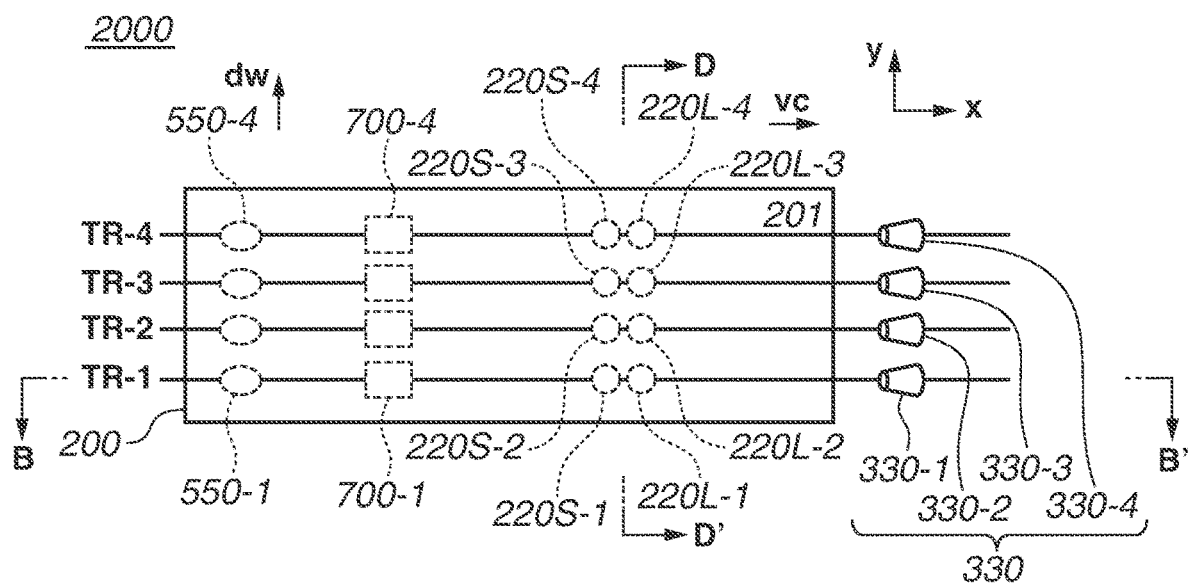
FIG. 7A is a view illustrating a schematic configuration of an identification apparatus according to a fifth embodiment.

An identification apparatus according to a fifth embodiment will be described below with reference to FIGS. 7A and 7B. FIG. 7A is a view illustrating an example of the conveyance portion 200 and a plurality of conveyance tracks TR-p, (p=1 to 4) which are a major portion of an identification apparatus 2000 according to the present embodiment. FIG. 7A corresponds to a view illustrating a light collecting unit and a discrimination device of the identification apparatus 2000 projected to a plane A-A' as a projection plane in FIG. 1 according to the first embodiment or FIG. 4 according to the third embodiment. A cross-section B-B' in FIG. 7A corresponds to the schematic configuration diagram in FIG. 1.

(Identification Apparatus)

In the identification apparatus 2000 illustrated in FIG. 7A, four imaging fields of view 700-p of the camera 76, four condensing spots 220S-p and four condensing spots 220L-p of irradiation light beams from the irradiation portions 22S-p and 22L-p, and four air nozzles 330-p are arranged in the conveyance width direction dw. An irradiation light beam is also referred to as "primary light beam". The air nozzles 330-p are components of the discrimination device 300. The identification apparatus 2000 is a multi-column identification apparatus including a plurality of identification units arranged in parallel at different positions in the conveyance width direction dw intersecting the conveyance direction dc. The identification apparatus 2000 has a more aggregated system and more parallelized identification processing than the identification apparatuses 1000 and 1100.

The identification apparatus 2000 includes four conveyance tracks TR-p defined by feeding regions 550-p from the feeder 500-p (p=1 to 4). In the identification apparatus 2000, the imaging fields of view 700-p, the condensing spots 220S-p and 220L-p of irradiation light beams, and the air nozzles 330-p are arranged in series correspondingly to the tracks TR-p (p=1 to 4). On each conveyance track TR-p, the condensing spots 220S-p and 220L-p of irradiation light beams are not simultaneously formed (emitted) to a test sample.

In increasing columns of the identification apparatus 2000, the elements of the conveyance portion 200 that are situated at different positions in the conveyance width direction dw can be arranged independently or can be arrayed. The identification apparatus 2000 may include, for example, a feeder 500A having an array of feeding openings and a multi-discrimination device 300MN having a multi-nozzle of air nozzles 300-p.

According to the present embodiment, secondary light beams 240S-p and 240L-p (not illustrated) are collected from the condensing spots 220S-p and 220L-p of irradiation light beams corresponding to the conveyance tracks TR-p (p=1 to 4). Then, the collected light beams are guided to the spectral image acquisition portion 10 via a plurality of optical fibers 190S-p and 190L-p (not illustrated) provided correspondingly to the conveyance tracks TR-p. The collimating lens 110, the dispersing portion 150, the dichroic mirror 151, the mirror 152, the imaging lens 160, and the imaging portion 170 of the spectral image acquisition portion 10 are shared by the plurality of secondary light beams 240S and 240L-p, i.e., the plurality of conveyance tracks TR-p. Thus, one of each element is provided in the identification apparatus 2000. On the other hand, the coupler 195-p (not illustrated) and the optical fiber 191-p (not illustrated) are provided correspondingly to each of the conveyance tracks TR-p.

The light exit ends 192-p (p=1 to 4) of the plurality of optical fibers 191-p (p=1 to 4) according to the present embodiment are arranged at predetermined intervals in the y-axis direction (vertical direction to this sheet) in FIG. 2B to form a light emission end array (not illustrated). The light exit end array is arranged at the position of the light exit end 192 of the light guiding portion 191 in FIG. 2B. With this arrangement, the spectral images 280S-p and 280L-p corresponding to the conveyance track TR-p are projected next to each other with a predetermined interval therebetween in the column direction 172c in the imaging portion 170 as illustrated in FIG. 7B. Meanwhile, as to the row direction 172r, a relationship between wavenumber shifts of the spectral images 280S-p and 280L-p and the photo detection element numbers in the row direction 172r of the imaging portion 170 is the same as in FIG. 2E. Specifically, formula 2 is satisfied at the specific the wavenumber shift w1-p (p=1 to 4).

Specifically, the distance $\Delta f$ between the projection positions of the spectral light beams corresponding to the predetermined wavenumber shift on the imaging portion 170 on each conveyance track TR-P is shorter than the distance $\Delta i$ between the optical paths of the spectral light beams corresponding to the predetermined wavenumber shift through the imaging lens 160 in the identification apparatus 2000. Specifically, since the identification apparatus 2000 according to the fourth embodiment shares the imaging portion 170 and is parallelized, the efficiency of use of the imaging portion 170 by the identification apparatus 2000 is further increased compared to the identification apparatus 1000.

Figure 7B:
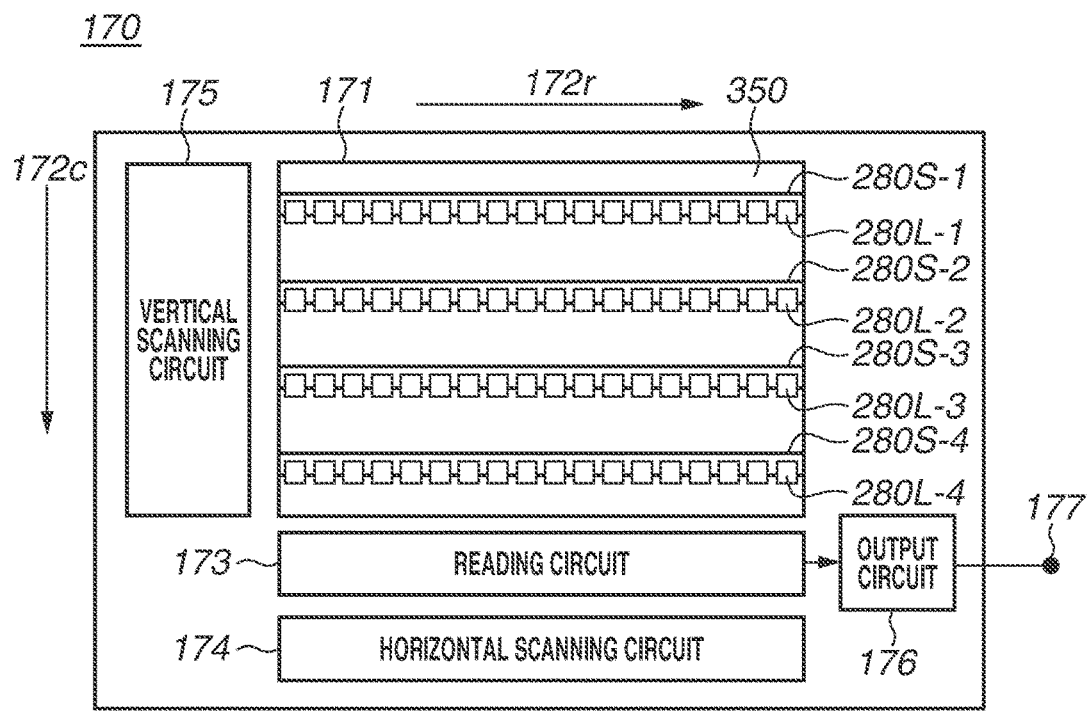
FIG. 7B is a view illustrating spectra projected to an imaging device.

According to the present embodiment, the spectral images 280S-p and 280L-p corresponding to the conveyance track TR-p are projected to overlap each other at least partially in the column direction 172c of the imaging portion 170 as illustrated in FIG. 7B as in the first embodiment. In order to use the imaging portion 170 effectively, the spectral images 280S-p and 280L-p are desirably projected so that the spectral images 280S-p and 280L-p are in parallel to each other along the row direction 172r and the overlap in the column direction 172c is greater. Moreover, the spectral images 280S-p and 280L-p are desirably projected to overlap each other so that at least one of the spectral images 280S-p and 280L-p includes the other in the column direction 172c.

Since only one of the secondary light beams 240S-p and 240L-p is used at each time point on each conveyance track TR-p, only one of the spectral images 280S-p and 280L-p is projected to the imaging portion 170.

While the present invention has been described with reference to embodiments, it is to be understood that the invention is not limited to the disclosed embodiments but is defined by the scope of the following.

This application claims the benefit of Japanese Patent Application No. 2021-058485, filed Mar. 30, 2021, which is hereby incorporated by reference herein in its entirety.

What is claimed is:

1. An identification apparatus comprising:
an irradiation portion optically connected to a light source configured to generate light beams of different excitation wavelengths, wherein the irradiation portion is configured to irradiate a test sample with the light beams;
a light collecting portion configured to collect a scattered light beam from the test sample irradiated with each light beam of the light beams;
a dispersing portion configured to disperse each light beam from the light collecting portion;
an imaging lens through which each spectral light beam dispersed by the dispersing portion travels; and
an imaging portion configured to image each spectral light beam projected through the imaging lens and acquire a spectral image,
wherein each spectral light beam corresponding to a predetermined wavenumber shift is projected to the imaging portion so that a distance between a projection position of a spectral light beam that corresponds to a predetermined wavenumber shift and is projected to the imaging portion and a changed projection position as a changed projection position result of the different excitation wavelength is shorter than a distance at the imaging lens between an optical path of the spectral light beam corresponding to the predetermined wavenumber shift and a changed optical path as a changed optical path result of the different excitation wavelength.

2. The identification apparatus according to claim 1, further comprising:
a light guiding portion having a test sample from which each of the light beams guided from the light collecting portion is emitted to the dispersing portion; and
a dichroic mirror between a light exit end and the imaging portion.

3. The identification apparatus according to claim 2, wherein the dichroic mirror is between the dispersing portion and the imaging lens and is configured to reflect one of the spectral light beams so that the optical paths of the different spectral light beams corresponding to the different excitation wavelengths become closer to each other.

4. The identification apparatus according to claim 2, wherein the dichroic mirror is between the light exit end and the dispersing portion and is configured to reflect one of the scattered light beams so that optical paths of the different scattered light beams corresponding to the different excitation wavelengths become closer to each other.

5. The identification apparatus according to claim 1, wherein the irradiation portion has a plurality of irradiation ends, configured to emit the light beams of different excitation wavelengths through different optical paths corresponding to the different excitation wavelengths to a placement portion where the test sample is placed at different time points, and
wherein the light collecting portion has a plurality of light collection ends configured to collect scattered light beams corresponding to the light beams of different excitation wavelengths.

6. The identification apparatus according to claim 1,
wherein the irradiation portion is configured to emit the light beams of different excitation wavelengths through different optical paths corresponding to the different excitation wavelengths to a placement portion where the test sample is placed at different time points,
wherein the light collecting portion has a plurality of light collection ends configured to collect each scattered light beams corresponding to the light beams of different excitation wavelengths,
wherein light guiding portions are configured to guide the scattered light beams from the plurality of light collection ends to the dispersing portion, and
wherein one pair among a plurality of light exit ends is situated at a different position from each other along a plane where a diffraction angle of the spectral light beam is changed.

7. The identification apparatus according to claim 2, wherein the light exit end, the dispersing portion, the imaging lens, and the imaging portion are accommodated in a lightproof container.

8. The identification apparatus according to claim 1, further comprising the light source including a laser light source configured to emit a light beam of at least a wavelength in a wavelength range from 400 nanometers (nm) to 1100 nm.

9. The identification apparatus according to claim 2, further comprising a positive-power lens between the light exit end and the dispersing portion.

10. The identification apparatus according to claim 1, further comprising an acquisition portion configured to acquire information about a property of the test sample based on the spectral image.

11. The identification apparatus according to claim 10, wherein a predetermined wavelength corresponding to the different excitation wavelengths corresponds to a predetermined property of the test sample.

12. The identification apparatus according to claim 11, wherein the predetermined property includes information about a predetermined molecular bond.

13. The identification apparatus according to claim 12, wherein the information about the predetermined molecular bond includes an eigenfrequency of the predetermined molecular bond.

14. The identification apparatus according to claim 1, wherein a predetermined wavelength corresponding to the different excitation wavelengths corresponds to the predetermined wavenumber shift of the scattered light beam from the light beam from the irradiation portion.

15. The identification apparatus according to claim 1, wherein the light collecting portion collects Raman scattered light from the test sample.

16. The identification apparatus according to claim 1, wherein the dispersing portion includes a grating.

17. The identification apparatus according to claim 1, wherein the imaging portion includes a plurality of photo detection elements.

18. The identification apparatus according to claim 1, further comprising a placement portion configured to place the test sample in an irradiation target region to be irradiated with the light beams from the irradiation portion.

19. The identification apparatus according to claim 18, wherein the placement portion includes a conveyance portion configured to convey the test sample in a predetermined direction.

20. The identification apparatus according to claim 6, wherein the plurality of light exit ends, the dispersing portion, the imaging lens, and the imaging portion are accommodated in a lightproof container.

* * * * *